United States Patent [19]
Yumine et al.

[11] Patent Number: 5,528,746
[45] Date of Patent: Jun. 18, 1996

[54] APPARATUS FOR CONTROLLING CASSETTE AUTO CHANGER

[75] Inventors: Toru Yumine; Yusuke Tani, both of Kanagawa, Japan

[73] Assignee: Sony Corporation, Tokyo, Japan

[21] Appl. No.: 141,611

[22] Filed: Oct. 27, 1993

[30] Foreign Application Priority Data

Oct. 31, 1992 [JP] Japan .................................. 4-315801

[51] Int. Cl.⁶ .............................. G06F 3/14; G11B 15/68
[52] U.S. Cl. .......................... 395/161; 395/159; 395/154; 360/92; 360/71
[58] Field of Search ................................. 395/161, 154, 395/159, 156, 157, 140; 364/188, 192; 360/92, 71, 69, 91, 78.03; 369/24, 30, 34, 178

[56] References Cited

U.S. PATENT DOCUMENTS

| | | | |
|---|---|---|---|
| 4,644,425 | 2/1987 | Tamaki | 360/92 X |
| 4,766,581 | 8/1988 | Korn et al. | 395/156 X |
| 4,907,889 | 3/1990 | Simone | 360/92 |
| 4,920,432 | 4/1990 | Eggers et al. | 360/92 X |
| 4,979,057 | 12/1990 | Matsumoto et al. | 360/71 |
| 5,307,456 | 4/1994 | MacKay | 395/154 |
| 5,412,773 | 5/1995 | Carlucci et al. | 395/156 |

FOREIGN PATENT DOCUMENTS

| | | |
|---|---|---|
| 0145268 | 6/1985 | European Pat. Off. . |
| 0162248 | 11/1985 | European Pat. Off. . |
| 0377474 | 7/1990 | European Pat. Off. . |
| 0501338 | 9/1992 | European Pat. Off. . |
| 0501343 | 9/1992 | European Pat. Off. . |
| 0542482 | 5/1993 | European Pat. Off. . |
| 0566351 | 10/1993 | European Pat. Off. . |

OTHER PUBLICATIONS

PATENT ABSTRACTS OF JAPAN vol. 010 No. 072 (P-438), 22 Mar. 1986, JP-A-60 209966 (SONY KK) 22 Oct. 1985, abstract.
PATENT ABSTRACTS OF JAPAN vol. 016 No. 451 (P-1424), 18 Sep. 1992, JP-A-04-157690 (Victor Co. of Japan Ltd.) 29 May 1992.

Primary Examiner—Raymond J. Bayerl
Attorney, Agent, or Firm—William S. Frommer; Alvin Sinderbrand

[57] ABSTRACT

An apparatus for controlling a cassette auto changer selectively takes out a plurality of cassettes accommodated within a predetermined cassette accommodating unit to load the cassette into a recording and/or a reproducing means and is enabled to further easily confirm the state of the cassette auto changer and operate the cassette auto changer. By arranging the configuration in such a manner that the states of the portions of the cassette auto changer are collectively visually illustrated on a display screen of a monitor and the respective portions are controlled on the display screen, the confirmation of the states of the portions of the cassette auto changer can further easily be made and they can be operated further easily.

14 Claims, 19 Drawing Sheets

| | | |
|---|---|---|
| IN CHANNEL 1 | = | LINE-1 |
| IN CHANNEL 2 | = | SATELLITE-1 |
| IN CHANNEL 3 | = | SATELLITE-2 |
| IN CHANNEL 4 | = | LOCO (STATION LOGO) |
| IN CHANNEL 5 | = | VTR1 (16A) |
| IN CHANNEL 6 | = | VTR2 (16B) |
| IN CHANNEL 7 | = | VTR3 (16C) |
| IN CHANNEL 8 | = | VTR4 (16D) |
| IN CHANNEL 9 | | |
| IN CHANNEL 10 | | |
| IN CHANNEL 11 | = | B.B (BLACK BURST) |
| IN CHANNEL 12 | = | C.B. (COLOR BAR) |

FIG. 3A

| | | |
|---|---|---|
| OUT CHANNEL 1 | = | CHANNEL A |
| OUT CHANNEL 2 | = | CHANNEL B |
| OUT CHANNEL 3 | = | CHANNEL C |
| OUT CHANNEL 4 | = | CHANNEL D |
| OUT CHANNEL 5 | = | VTR1 (16A) |
| OUT CHANNEL 6 | = | VTR2 (16B) |
| OUT CHANNEL 7 | = | VTR3 (16C) |
| OUT CHANNEL 8 | = | VTR4 (16D) |
| OUT CHANNEL 9 | | |
| OUT CHANNEL 10 | | |
| OUT CHANNEL 11 | = | NEXT MONITOR |
| OUT CHANNEL 12 | | |

FIG. 3B

APPARATUS FOR CONTROLLING CASSETTE AUTO CHANGER

BACKGROUND OF THE INVENTION

1. Field of the Invention

This invention relates to an apparatus for controlling a cassette auto changer, and is applicable to a cassette auto changer control apparatus for selectively taking out a cassette from shelves accommodated a plurality of cassettes storing a tape recording medium or a disc recording medium, to load the cassette into a predetermined recording and/or reproducing apparatus so that data signal is recorded on the tape recording medium or the disc recording medium, or reproduced the data signal from the same to continuously record and/or reproduce for many hours.

2. Description of the Related Art

Hitherto, a patent application for such a cassette auto changer has been filed by this applicant, U.S. patent appln. Ser. No. 07/971,070, now U.S. Pat. No. 5,450,254 in which, shelves having a plurality of accommodating units for accommodating a plurality of cassettes included a magnetic tape or the like, as recording medium (hereinafter called "bin") are provided, and the cassette accommodated in each bin is selectively taken out at need, and conveyed and loaded into a predetermined video tape recorder (VTR) by a conveyance device (elevator) to record and/or reproduce predetermined information (video signal or the like) from and/or to the magnetic tape stored into the cassette. The cassette auto changer of the foregoing type is enabled to accommodate plural types of cassettes having different recording formats and cassettes having different sizes.

The foregoing cassette auto changer has a switcher for switching connections of a plurality of input lines and output lines. In accordance with the state of the connection of the switcher, output signals of a plurality of VTRs are outwardly transmitted through corresponding output channels. Further, video signal obtained from external video sources are supplied to the corresponding VTRs through allocated input channels.

The cassette auto changer thus constituted is arranged to receive a command to convey the cassette issued from a predetermined cassette conveyance control device to send and receive the selected cassette between the bin and the VTR. When a user gives a predetermined command to a VTR control portion which is provided individually, the VTR is controlled to be brought into a recording or reproducing state. When the switcher is controlled, the switcher control device switches the connections of the input and output channels of the switcher.

As described above, the cassette auto changer is arranged in such a manner that the control device provided for each apparatus, that constitutes the cassette auto changer, is instructed by the user to issue a command so that the respective apparatuses are individually controlled. When the foregoing control is performed, the user causes a control menu, which is set for each apparatus, to be displayed on a monitor so that the control command is issued to each apparatus.

Incidentally, in the cassette auto changer control apparatus for controlling the cassette auto changer of the foregoing type, there are kinds of problems for example, complexity of operating and mishandling.

First, there is a problem that the user must input control commands in accordance with independent control menus to control operations of, conveying of the cassette, recording and/or reproducing of the VTR, and changing over of the switch, etc. Therefore, there is a problem in that the operation inevitably becomes complicated.

Secondly, when confirming or discriminating the accommodating state of the cassettes of the cassette accommodating unit (bin) (e.g., of existence of the cassettes), it must execute the operation for confirming or discriminating the accommodating state of the cassette accommodating unit (bin) every time. Further, when giving the command to convey the cassette accommodated to the cassette accommodating unit (bin) into the VTR, there is a problem that is difficult to give the command as well as confirm the state of the cassette accommodating unit (bin).

Thirdly, when discriminating whether the recording and/or reproducing apparatus (for example, the VTR) is in the operating state, it is required that the operation for confirming the state of the VTR every time, as well as execute the operation for confirming the state of the VTR and operating the VTR individually. Therefore, there is an operational difficulty.

Fourth, when executing the conveying of the cassette between the cassette accommodating unit (bin) and the recording and/or reproducing apparatus (for example, the VTR), a plurality of cassette accommodating units, or VTRs, the user must input conveying command data of the present position and the moving position into the control device every time. Therefore, there is problem that the operational difficulty due to the complexity of the input operation and it is feared the mishandling.

Fifth, when the cassette loaded into the recording and/or reproducing apparatus (for example, the VTR) is returned to the accommodated position of the cassette accommodating unit (bin), the user must input the conveying command data of the present position and the moving position into the control device every time. Therefore, there are problems that the operational difficulty due to the complexity of the input operation and it is feared the mishandling.

Sixth, when switching the connection of the input line and the output line of the switch, it is required the troublesome operation that after designating the channel number of the input line, the user designates the channel number of the output line. Therefore, there are problems that the switching operation becomes complex as well as it is difficult to confirm easily the connection state of the switch.

Seventh, such a cassette auto changer can use as switcher by combining with various configuration of devices, however, it is required the switcher control device corresponding to the configuration of the switcher (number of input lines and output lines and existence of a monitor line), therefore, there is a problem that the cassette auto changer is not corresponding to various configurations of switchers.

SUMMARY OF THE INVENTION

In view of the foregoing, an object of this invention is to provide an apparatus for controlling a cassette auto changer in which, the operation state of a whole cassette auto changer or each component (each device) which is composed of the cassette auto changer is easily confirmed, as well as the whole apparatus or each component (each device) is easily controlled.

The foregoing object and other objects of this invention have been achieved by the provision of an apparatus for controlling a cassette auto changer which selecting takes out a plurality of cassettes accommodated to a predetermined cassette accommodating unit, to load recording and/or reproducing apparatuses, comprising: display means for visually displaying illustrations showing the states of respective components consisting the cassette auto changer on a display screen, and displaying an illustration changed that corresponding to the operation state of respective components consisting the cassette auto changer operating means for operating the respective components consisting the cassette auto changer on the display screen; and control means for controlling respective components of the cassette auto changer based on the data corresponding to the operation of the operating means, and controlling the display means so as to change the illustration displayed on the display screen of the display means. An apparatus for controlling a cassette auto changer also, comprising: bins for accommodating cassettes stored a recording medium; a plurality of recording and/or reproducing means for recording a data signal on the recording medium into the cassettes and reproducing the data signal from the recording medium; an elevator for conveying and delivering the cassettes between the bins and a plurality of recording and/or reproducing means, and between the bins and a plurality of recording and/or reproducing means; a switcher for selectively outputting the data signal output from the recording and/or reproducing means to a plurality of output lines, and selectively inputting the data signal from a plurality of input lines to the recording and/or reproducing means; display means for visually displaying an illustration showing the state of, the bins, the plurality of recording and/or reproducing means, and the switcher on the same display screen, and displaying an illustration changed that corresponding to the operation state of, the bins, the plurality of recording and/or reproducing means, and the switcher operating means for operating the bins the plurality of recording and/or reproducing means, and the switcher on the display screen; control means for controlling the bins the plurality of recording and/or reproducing means, the elevator and the switcher based on the data corresponding to the operation of the operating means, and for controlling the display means so as to change the illustration displayed on the display screen by said display means.

The nature, principle and utility of the invention will become more apparent from the following detailed description when read in conjunction with the accompanying drawings in which like parts are designated by like reference numerals or characters.

BRIEF DESCRIPTION OF THE DRAWINGS

In the accompanying drawings:

FIGS. 3A and 3B are charts showing an example of use of the channels of a switcher;

DETAILED DESCRIPTION OF THE EMBODIMENT

Preferred embodiments of this invention will be described with reference to the accompanying drawings:

(1) Configuration of Cassette Auto Changer

Figure 1:
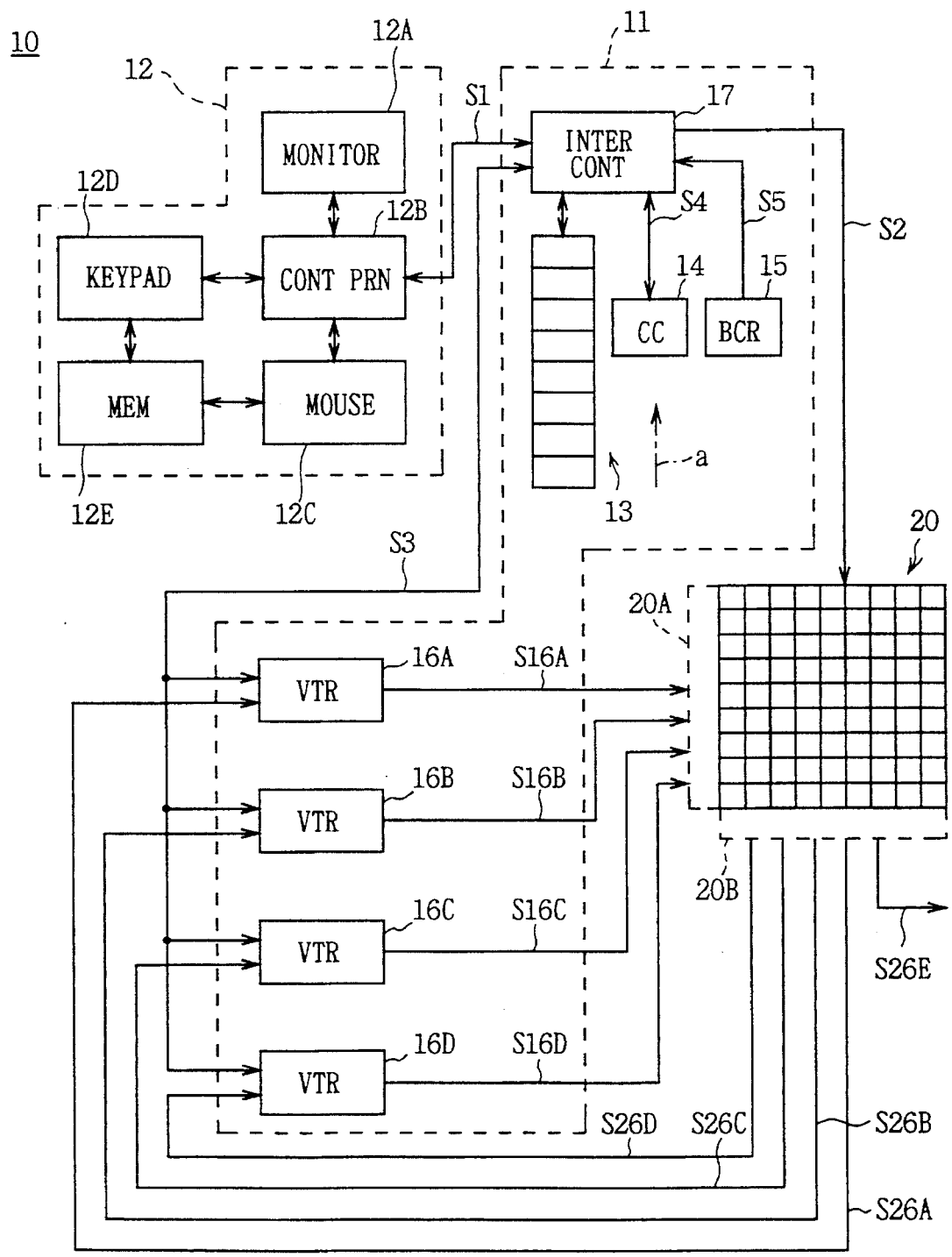
FIG. 1 is a block diagram showing an embodiment of a cassette auto changer according to this invention.

In FIG. 1, 10 generally shows a cassette auto changer composed of a cassette auto changer main portion 11, a switcher 20, and an external control device 12.

In the cassette auto changer main portion 11, control signal S1 output from a control portion 12B of the external control device 12 is input to an internal control device 17 to control a cassette conveyance device 14, VTRs 16A to 16D, and the switcher 20 based on the control signal S1.

That is, when the conveyance of the cassette is instructed by the control signal S1, the internal control device 17 transmits conveyance command signal S4 to the cassette conveyance device 14. As a result, the cassette conveyance device 14 is moved in a direction designated by an arrow "a" or in an opposite direction so that the cassette is sent and received between the cassette accommodating unit 13 accommodating the plural cassettes and the VTRs 16A to 16D.

Figure 2:
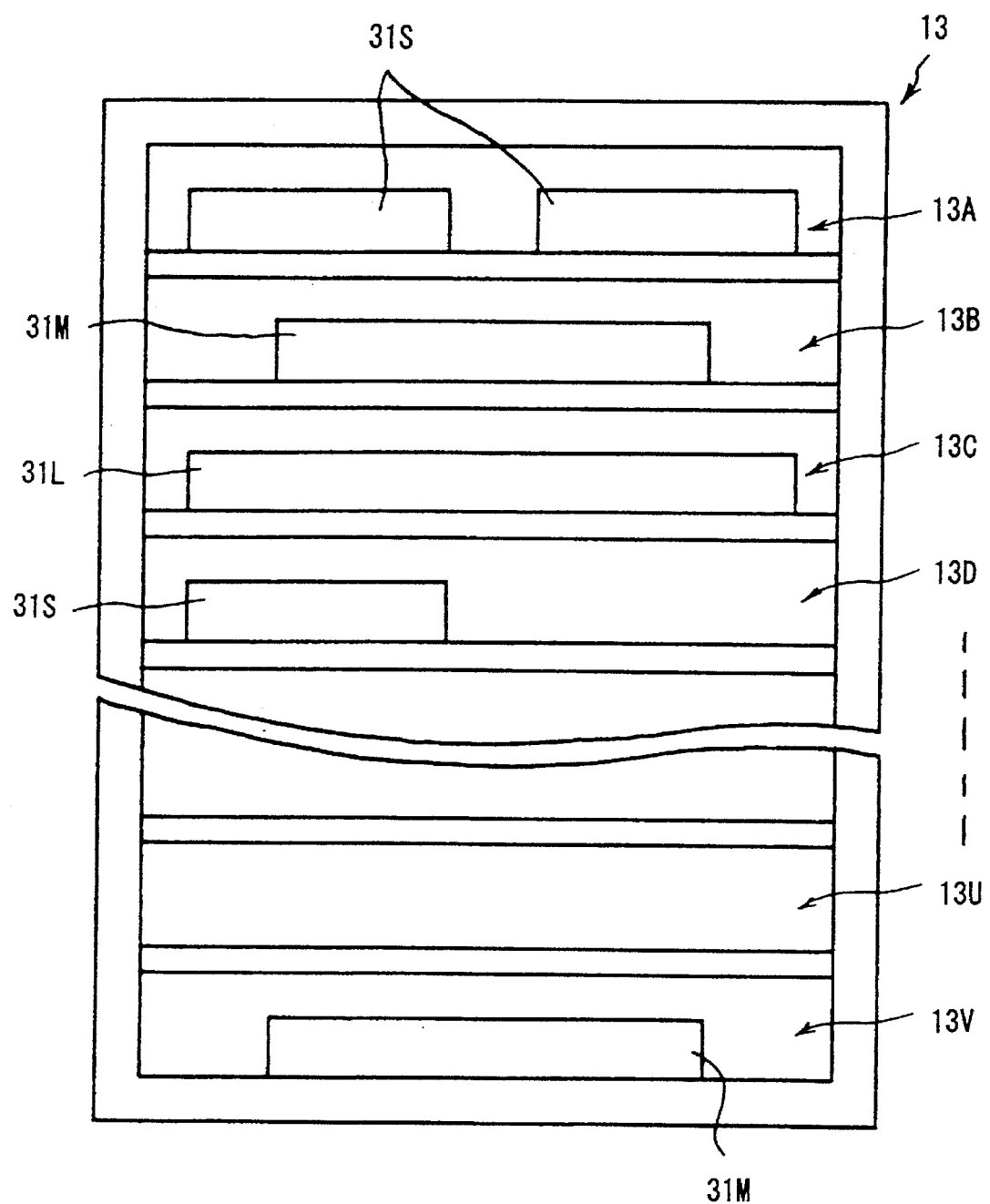
FIG. 2 is a schematic diagram showing the configuration of bins of a cassette accommodating unit.

As shown in FIG. 2, the cassette accommodating unit 13 has bins (shelves) 13A to 13V for accommodating the cassettes, each of the bins 13A to 13V being enabled to accommodate arbitrarily three types of cassettes 31L, 31M and 31S having different sizes. That is, each of the bins 13A to 13V is able to accommodate two smallest-cassettes 31S while distributing them laterally. Each of the bins 13A to 13V is able to accommodate one medium-size cassette 31M or one largest-cassette 31L.

Therefore, an example of the cassette accommodation state as shown in FIG. 2 is realized in which the cassettes 31S are laterally disposed in the first bin 13A, the cassette 31M is accommodated in the second bin 13B, one cassette 31S is accommodated in only the left portion of the fourth bin 13D, no cassette is accommodated in the twenty-first bin 13U, and the cassette 31M is accommodated in the twenty-second bin 13V.

As described above, a predetermined cassette is taken out from the cassette accommodating unit 13 accommodating the cassette 31L, 31M, and 31S by the cassette conveyance device 14, to convey and load the cassette into any one of the VTRs 16A to 16D. As a result, the cassette accommodated in the cassette accommodating unit 13 can selectively be loaded into the VTRs 16A to 16D.

A bar code reading device 15 is disposed adjacent to a cassette holding portion of the cassette conveyance device 14. By reading a bar code attached to the cassette to be conveyed by the cassette conveyance device 14 and by transmitting it as read signal S5 to the internal control device 17, identification (ID) information or the like of the cassette to be conveyed can be read.

When the internal control device 17 is instructed to control the VTRs 16A to 16D by the control signal S1 supplied from the external control device 12, the internal control device 17 transmits VTR control signal S3 to the corresponding VTRs 16A to 16D. As a result, the VTRs 16A to 16D can be controlled to each of various operational states, such as, the recording, reproducing, fast forward sending, reverse sending, and introduction scanning states. Therefore, the VTRs 16A to 16D are able to record or reproduce information from the loaded cassette conveyed from the cassette accommodating portion 13.

When the internal control device 17 is supplied an instruction to switch the connection of the input/output line of the switcher 20 in response to the control signal S1 transmitted from the external control device 12, the internal control device 17 transmits switcher control signal S2 to switch the state of the connection of the switcher 20.

That is, the switcher 20 has an input bus 20A composed of 12-channel input lines and an output bus 20B composed of 12-channel output lines. By switching the connections of the input lines and the output lines in response to the switcher control signal S2 transmitted from the internal control device 17, the signals supplied to the respective input lines of the input bus 20A are transmitted from the corresponding output lines of the output bus 20B. FIGS. 3A and 3B show an example of use of the respective channels of the input bus 20A and the output bus 20B of the switcher 20. As shown in FIG. 3A, in the input bus 20A, the input channel 1 is allocated to an external input line (LINE-1), the input channels 2 and 3 are allocated to input lines (Satellite-1 and 2) of the satellite broadcast, the input channel 4 is allocated to the input lines of a station logo (LOGO) which is displayed at the time of the completion of the broadcast, the input channels 5 to 8 are allocated to input lines of signals to be transmitted from four VTRs 16A to 16D of the cassette auto changer 10, the input channel 11 is allocated to the input line of a black burst (B.B), and the input channel 12 is allocated to the input line of a color bar (C.B).

As shown in FIG. 3B, the output channels 1 to 4 are allocated to channels A to D, and the output channels 5 to 8 are allocated to output lines for transmitting information to the four VTRs 16A to 16D of the cassette auto changer 10.

Therefore, output signals S16A to S16D transmitted from the VTRs 16A to 16D are received by the input channels 5 to 8 of the input bus 20A of the switcher 20 (FIG. 1), while signals S26A to S26D transmitted from the output channels 5 to 8 of the output bus 20B are received by the VTRs 16A to 16D.

By controlling the connections of the respective input and output channels of the input bus 20A and the output bus 20B in response to the switcher control signal S2 as described above, establishment of the connection between, for example, the input channel 5 of the input bus 20A and the output channel 1 of the output bus 20B enables a picture reproduced by the VTR 16A to be transmitted through the channel A. If the input channels 2 of the input bus 20A is connected to the output channel 6 of the output bus 20B, a received picture of the satellite broadcast can be recorded by the VTR 16B.

(2) Display of State and Control by External Control Device (2-1) Configuration of External Control Device The internal control device 17 of the cassette auto changer 10 is controlled in response to the control signal S1 supplied from the external control device 12. The external control device 12 is composed of a control portion 12B, the monitor 12A, a mouse 12C, for moving and clicking the cursor displayed on the monitor 12A, a key board 12D for inputting each data, and a memory 12E for memorizing the data input from the mouse 12C and the key board 12D.

The monitor 12A is so arranged as to graphic-display sequentially the states of the respective portions of the cassette auto changer 11 and the switcher 20. When user moves or clicks the cursor on the display screen by making use of the mouse 12C, the cassette auto changer main portion 11 and the switcher 20 can be controlled on the monitor 12A.

Accordingly, the cassette auto changer 10 is arrange in such a manner that the states of the cassette auto changer main portion 11 and the switcher 20 are sequentially displayed on the monitor 12A of the external control device 12. As a result, the states of the respective portions can be grasped collectively. Further, by controlling each portion by using the mouse 12C and the monitor 12A, the cassette auto changer main portion 11 and the switcher 20 can be controlled further easily.

The method of operation of each component constituting the whole cassette auto changer (respective devices, the bin 13, elevator 14, VTRs 16A to 16D, and switcher 20 or the like) on the display screen of the monitor 12A, will be detailed described.

(2-2) Display of State of Bins

Figure 4:
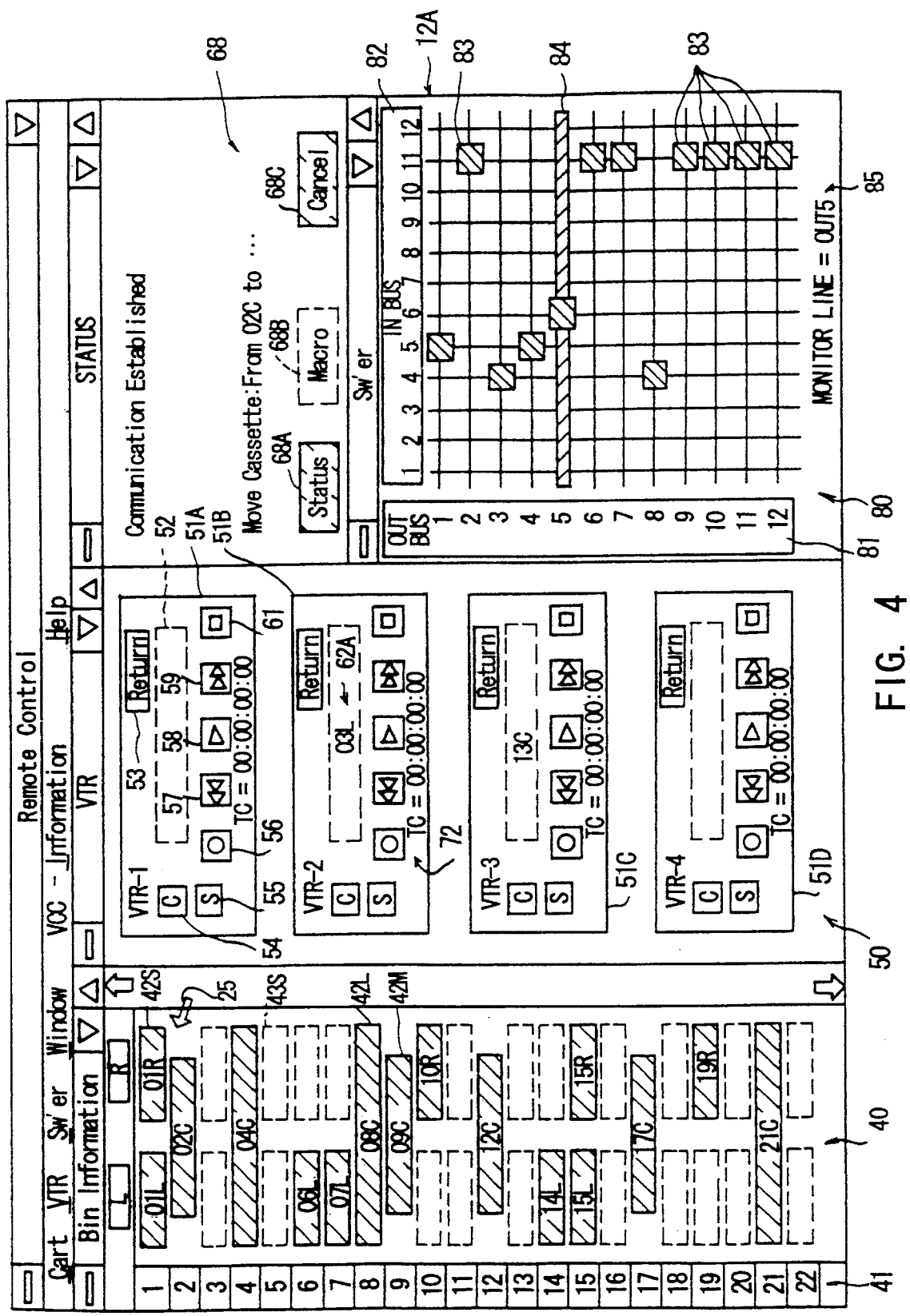
FIG. 4 is a schematic diagram illustrating an example of monitor display performed in a cassette auto changer control apparatus according to this invention.

FIG. 4 shows an example of the display made on the monitor 12A in such a manner that the states of the bins 13 (FIG. 1) of the cassette auto changer main portion 11, the VTRs 16A to 16D and the switcher 20 are sequentially displayed.

As shown in FIG. 4, a bin display portion 40 visually displays the state of the cassette accommodating unit 13 of the cassette auto changer main portion 11 in accordance with the result of detection performed by a detection device (not shown) provided for the cassette accommodating unit 13 in such a manner that any one of numbers 1 to 22 is displayed on a display portion 41 in accordance with the state of the bins 13A to 13V (FIG. 2). If a cassette is accommodated on the bin corresponding to the state display portion 41, display is performed such that, in a case where the accommodated cassette is the smallest cassette (hereinafter called "S cassette") 31S, a cassette character 42S designating this fact is displayed. In a case where the accommodated cassette is the middle size cassette (hereinafter called "M cassette") 31M, a cassette character 42M designating this fact is displayed. In a case where the accommodated cassette is the largest size cassette (hereinafter called "L cassette") 31L, a cassette character 42L designating this fact is displayed.

Since the smallest cassette 31S can be accommodated in either of the right portion or the left portion of each of the bins 13A to 13V, the cassette character 42S is displayed at the corresponding right or the left position in the case where the smallest cassette 31S is accommodated.

The state and the position at which the cassette is accommodated are further displayed in each of the cassette characters 42L, 42M, and 42S that indicate the cassettes accommodated in the bins. That is, if the S cassette 31S is accommodated, it is accommodated in the right or the left portion of each bin. Therefore, "R" indicating the right or "L" indicating the left is displayed together with the state of the bin. Therefore, if the S cassette 31S is accommodated in the right portion of the first bin, the cassette character 42S is, on the monitor 12A, displayed on the right side of the position corresponding to the number "1" of display portion 41 designating the first bin. Further, "01R" is displayed in the cassette character 42S.

By displaying the bin display portion 40 on the monitor 12A as described above, the state where the cassette is accommodated in the cassette accommodating unit 13 of the cassette auto changer main portion 11 can be visually displayed.

As for the bin that does not accommodate the cassette, a dashed-line character 43S having the same size as that of the cassette character 42S is displayed at the position at which the cassette character 42S is displayed if the S cassette 31S is accommodated so that a fact that the cassette is not accommodated in the bin is visually displayed.

Figure 5:
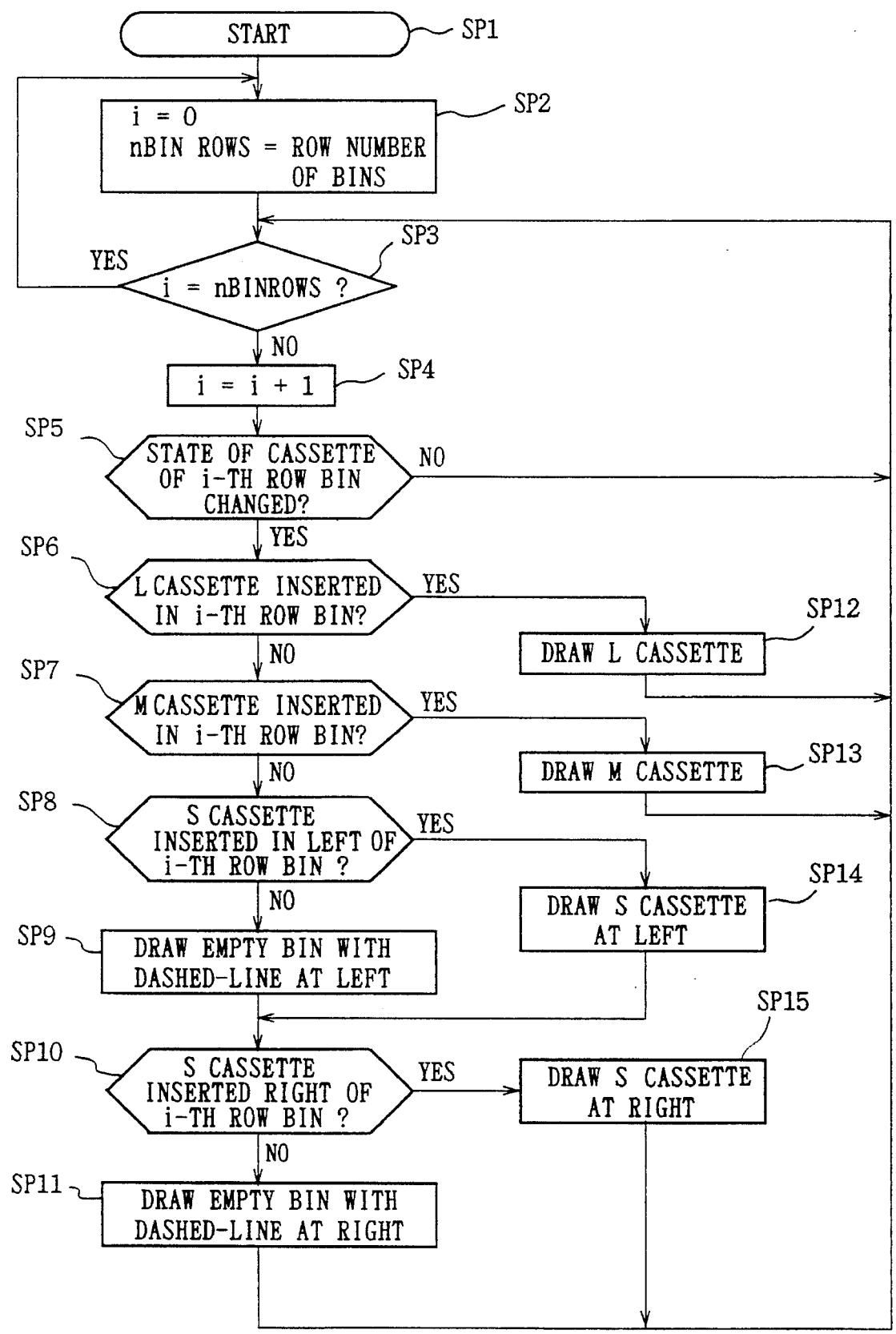
FIG. 5 is a flow chart showing the procedure of a cassette accommodation state display process on a monitor.

FIG. 5 shows the procedure for displaying the cassette characters on the foregoing bin display portion 40. When the control portion 12B of the external control device 12 is instructed to perform the mode for displaying the state of the cassette auto changer 10, the cassette display procedure proceeds in step SP1. In the step SP2, parameter i is made to be 0, and the number of the rows (states of the bins 13A to 13V are allocated to nBinRow. In the next step SP3, whether or not the value of i coincides with nBinRow (that is, the number of the bins) is determined.

If an affirmative result is obtained, the control portion 12B returns to the foregoing step SP2 in which a similar process is repeated. If a negative result is obtained in step SP3, the control portion 12B adds 1 to the value of i in step SP4, and then discriminates whether or not the state of the cassette (that is, the cassette has been inserted or ejected) in the bin of i-th row has been changed.

If a negative result is obtained, it means a fact that the state of the cassette in the bin of the i-th row is not changed. At this time, the control portion 12B returns to the foregoing step SP3 in which a similar process is repeated. If an affirmative result is obtained in step SP5, it means a fact that a cassette has been inserted or ejected from the i-th row bin. At this time, the control portion 12B proceeds to the next step SP6 in which a discrimination is made whether or not the L cassette 31L has been inserted into the i-th row bin.

If an affirmative result is obtained, it means a fact that the L cassette 31L has been inserted into the i-th row bin. The control portion, at this time, draws the cassette character 42L designating the L cassette 31L at a position corresponding to the i-th row in the bin display portion 40 on the monitor 12A in step SP12, and then returns to the foregoing step SP3. If a negative result is obtained in step SP6, it means a fact that the L cassette 31L is not inserted into the i-th row bin. At this time, the control portion 12B proceeds to the next step SP7 in which it discriminates whether or not the M cassette 31M has been inserted into the i-th row bin.

If an affirmative result is obtained, it means a fact that the M cassette 31M has been inserted into the i-th row bin. The control portion 12B, at this time, draws the cassette character 42M designating the M cassette 31M at a position corresponding to the i-th row in the bin display portion 40 on the monitor 12A in step SP13, and then returns to the foregoing step SP3. If a negative result is obtained in step SP7, it means a fact that the M cassette 31M is not inserted into the i-th row bin. At this time, the control portion 12B proceeds to the next step SP8 in which it discriminates whether or not the S cassette 31S is inserted into the left portion of the i-th row bin.

If an affirmative result is obtained, it means a fact that the S cassette 31S has been inserted into the left portion of the i-th row bin. The control portion 12B, at this time, draws the cassette character 42S designating the S cassette 31S at a position corresponding to the left portion of the i-th row in the bin display portion 40 of the monitor 12A in step SP14, and then it returns to the foregoing step SP3. If a negative result is obtained in SP8, it means a fact that the S cassette 31S has not been inserted into the left portion of the i-th row bin. At this time, the control portion 12B proceeds to the next step SP9 in which it draws a dashed-line character 43S designating the empty bin in the left portion of the i-th row bin. In next step SP10, it discriminates whether or not the S cassette 31S has been inserted into the right portion of the i-th row bin.

If an affirmative result is obtained, it means a fact that the S cassette 31S has been inserted into the right portion of the i-th row bin. At this time, the control portion 12B, in step SP15, draws the cassette character 42S designating the S cassette 31S at a position corresponding to the right portion of the i-th row of the bin display portion 40 on the monitor 12A, and then it returns to the foregoing step SP3. If a negative result is obtained in step SP10, it means a fact that the S cassette 31S is not inserted into the right portion of the i-th row bin. At this time, the control portion 12B proceeds to the next step SP11 in which it draws the dashed-line character 43S designating the empty bin in the right portion of the i-th row bin, and returns to the foregoing step SP3 in which it repeats a similar process.

Thus, the bin display portion 40 of the monitor 12A visually displays the state where the cassette is accommodated in the cassette accommodating portion 13 of the cassette auto changer main portion 11.

With the above configuration, the cassette auto changer 10 visually displays each of bins 13A to 13V of the cassette accommodating unit 13 in the cassette auto changer main portion 11 on the monitor 12A of the external control device 12 as the bin display portion 40, to display the dashed-line character 43S designating that the cassette characters 31L, 31M, and 31S, and the bin not accommodating the cassette, in response to the state of accommodating of the cassettes of the cassette accommodating unit 13 (existence of the cassette). At this time, the dashed-line character 43S designating the cassette characters 31L, 31M, and 31S of the bin display portion 40, and the bin not the cassette is clicked, so as to designate the position in cassette conveying and the position moving the cassette. Thereby, confirming of the state of the cassette accommodating unit 13 and the operation can be improved more easily.

(2-3) Display of State of VTR and Control

The monitor 12A is arranged to display the states of the VTRs 16A to 16D of the cassette auto changer main portion 11 as well as to display the foregoing bin display portion 40. That is, as shown in FIG. 4, a VTR display portion 50 for displaying the states of the VTRs 16A to 16D of the cassette auto changer main portion 11 is formed adjacent to the bin display portion 40.

On the VTR display portion 50, VTR characters 51A, 51B, 51C, and 51D respectively corresponding to the VTRs 16A, 16B, 16C, and 16D of the cassette auto changer 11 are drawn so that the states of the VTRs 16A to 16D are visually displayed.

In each of the VTR characters 51A to 51D, a plurality of operation characters formed into the same shapes as those of the actual operation portions of the VTRs 16A to 16D are drawn. That is, an insertion port character 52 corresponding to the cassette insertion portion, a return key character 53 corresponding to a return key for returning the cassette loaded into the VTR to the original bin, a cue-up key character 54 corresponding to a cue-up key with which cue-up (introduction scanning) is instructed, a standby key character 55 corresponding to a standby key with which standby of recording is instructed, an image recording key character 56 corresponding to an image recording key, a rewinding key character 57 corresponding to a rewinding key, a reproducing key character 58 corresponding to a reproducing key, a fast sending key character 59 corresponding to a fast sending key, and a stop key character 61 corresponding to a stop key respectively are drawn together with the VTR characters 51A to 51D.

Further, the VTR characters 51A to 51D respectively have time code display portions 72 that display the time codes recorded on the recording mediums in the cassettes loaded into the corresponding VTRs 16A to 16D.

If the cassettes are loaded into the VTRs 16A to 16D, the colors of the VTR characters 51A to 51D are changed, and the sender bins which have sent the loaded cassettes are displayed by sender data 62A. As a result, the senders of the cassettes can be confirmed, and whether or not the cassettes have been loaded into the VTR characters 51A to 51D can be confirmed.

Figure 6:
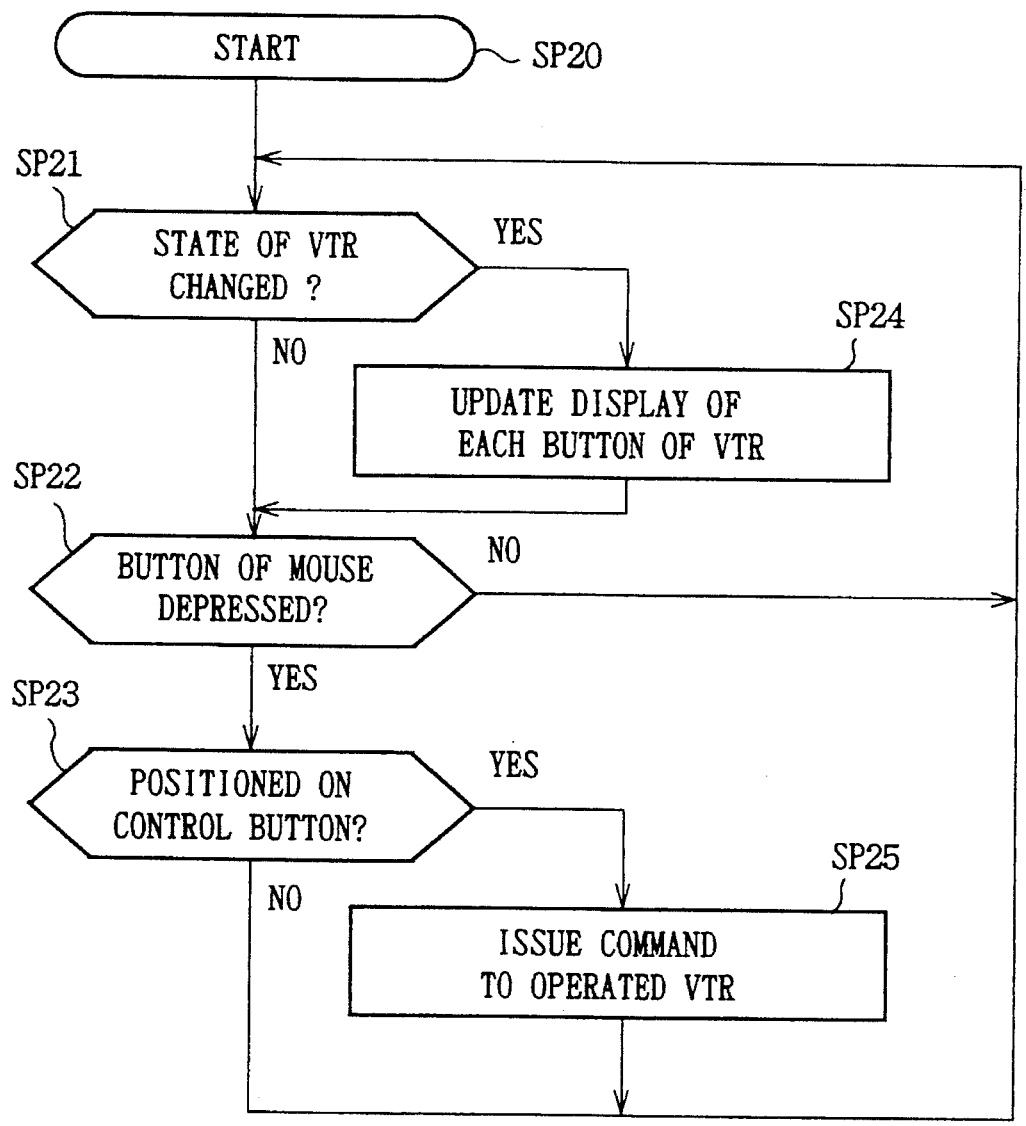
FIG. 6 is a flow chart showing the procedure of a process for displaying the states of VTRs on the monitor.

FIG. 6 shows the procedure of the process for displaying the VTR character on the VTR display portion 50. When the state display mode of the cassette auto changer 10 is instructed, the control portion 12B of the external control device 12 is brought into the VTR character display process in step SP20. In step SP21, whether or not the states of the VTRs 16A to 16D have been changed is discriminated.

If an affirmative result is obtained, it means a fact that the state of any one of the VTRs 16A to 16D has been changed. At this time, the control portion 12B, in step SP24, changes drawing of the operation characters of the VTR characters 51A to 51D that correspond to the VTR, the state of which has been changed. Therefore, if the VTR 16A has been brought into the reproduction state, the displayed brightness or the color of the reproduction key 58 is changed to enable the user to confirm that the VTR 16A has been changed to the reproduction state due to the change of the display.

If a negative result is obtained in step SP21, it means a fact that the states of the VTRs 16A to 16D have not been changed. At this time, the control portion 12B proceeds to next step SP22 in which it discriminates whether or not the button of the mouse 12C (FIG. 1) has been depressed.

If a negative result is obtained, it means a fact that the user's instruction has not been made. At this time, the control portion 12B returns to the foregoing step SP21. If an affirmative result is obtained, it means a fact that the user has inputted an instruction by making use of the mouse 12C. At this time, the control portion 12B proceeds to step SP23 in which it discriminates whether or not the cursor 25 (FIG. 4) of the monitor 12A, which is moved by the mouse 12C, is positioned on any one of the operation characters of the VTRs 51A to 51D.

If a negative result is obtained, it means a fact that the user has not instructed the operations of the VTRs 16A to 16D. At this time, the control portion 12B returns to the foregoing step SP21. If an affirmative result is obtained in step SP23, it means a fact that the user has instructed the operations of the VTRs 16A to 16D. At this time, the control portion 12B proceeds to step SP25 in which it issues, to the operated VTR (16A, 16B, 16C, or 16D), a command which corresponds to the foregoing operation.

Therefore, if the use operates the mouse 12C to shift the cursor 25 on the monitor 12A on to, for example, the reproduction key 58 of the VTR character 51A and further performs a clicking operation at the foregoing position, the VTR 16A commences the reproduction operation. Further, the displayed brightness or the color of the reproduction key 58 of the VTR character 51A drawn on the monitor 12A is changed.

As a result, the user is able to operate the VTRs 16A to 16D on the monitor 12A, and to sequentially visually confirm the states of the VTRs 16A to 16D on the same monitor 12A.

Figure 7:
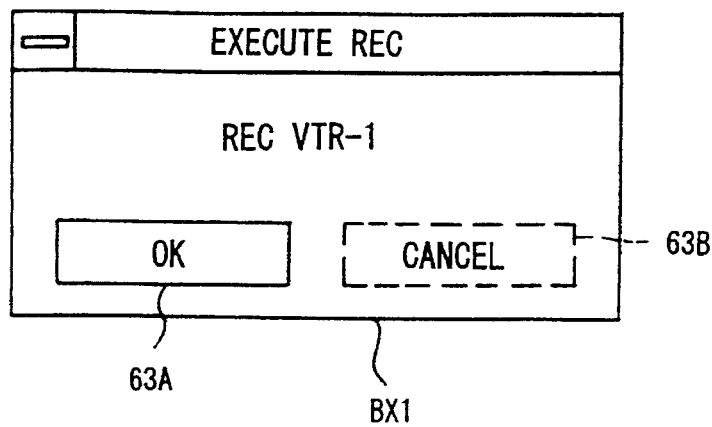
FIG. 7 is a schematic diagram illustrating an example of display of a recording dialogue box.

When the image recording key character 56 of the VTR characters 51A to 51D has been clicked, a dialogue box BX1 as shown in FIG. 7 is displayed in a portion of the monitor 12A. Whether or not recording of image is performed or stopped can be instructed by clicking the operation character 63A or 63B.

Figure 8:
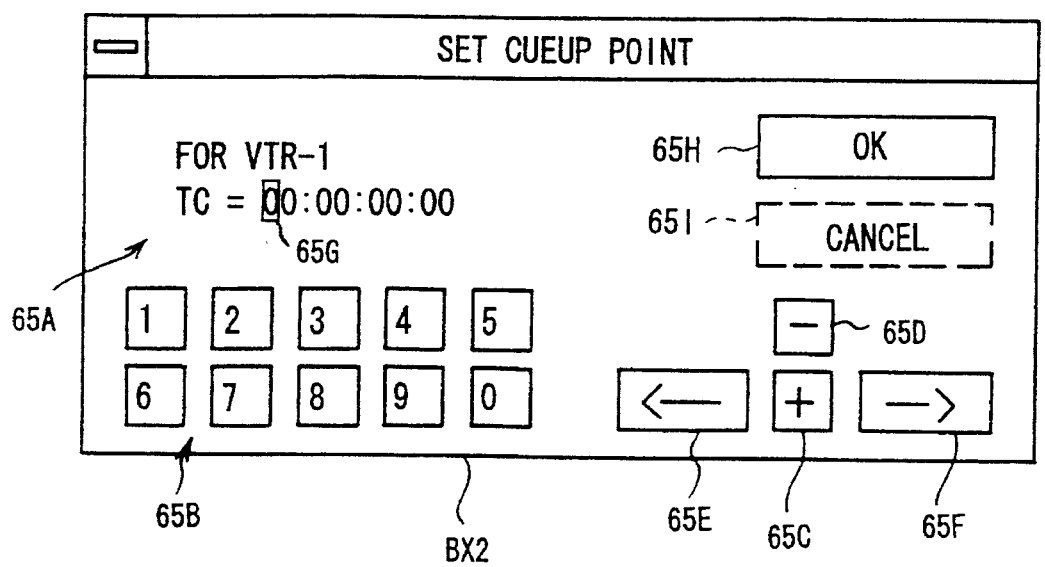
FIG. 8 is a schematic diagram illustrating an example of display of a cue-up dialogue box.

When the cue-up character 54 of the VTR characters 51A to 51D is clicked, a dialogue box BX2 as shown in FIG. 8 is displayed in a portion of the monitor 12A. As a result, the user is able to instruct a cue-up point (leading point) with the dialogue box BX2.

That is, a change instruction character 65G of the time code data 65A displayed in the dialogue box BX2 is shifted to an unit, which is intended to be changed, by clicking the cursor 25 (FIG. 4). By instructing a number key character 65B by using the cursor 25, the unit, which is intended to be changed, can be made the number of the clicked number key character 65B.

The position of the change instruction character 65G can be shifted laterally by clicking movement characters 65E and 65F. Further, by clicking an increment key character 65C and a decrement key character 65D, the number of the unit designated by the change instruction character 65G can be changed. Further, the time code data 65A can be inputted from the key board 12D, at this time, the set of the cue-up point (head searching position) is finished. Then, the operation key character 65H is clicked so as to execute the cue-up. If the operation key character 65I is clicked, the cue-up can be canceled.

In this manner, with the above configuration, the cassette auto changer 10 visually displays the VTRs 16A to 16D of the cassette auto changer main portion 11 on the monitor 12A of the external control device 12 as the VTR characters 51A to 51D, as to change the VTR characters 51A to 51D corresponding to the state of motion of the VTRs 16A to 16D. At this time, each of VTRs 16A to 16D is operated on the monitor 12A by using the cursor 25, thereby, the confirmation of the state of the VTRs 16A to 16D and operation can be improved more easily.

(2-4) Control of Conveyance of Cassette by Cursor

In the cassette auto changer 10, instruction and clicking of the bin display portion 40 and the VTR display portion 50 (FIG. 4) displayed on the monitor 12A of the external control device 12 by making use of the cursor 25 enables the cassette to be conveyed between the bins of the cassette accommodating unit 13 and the VTRs 16A to 16D.

Figure 9:
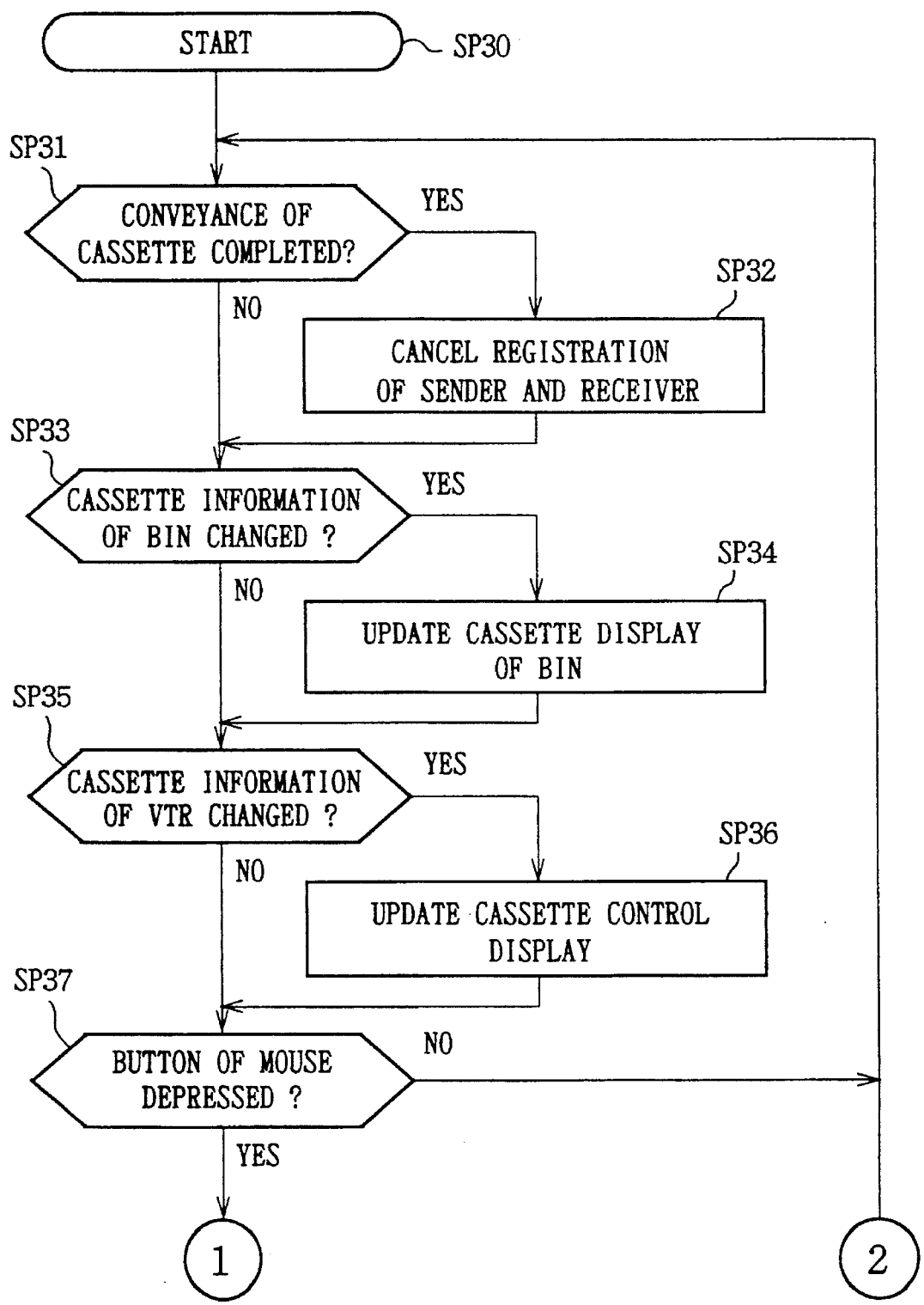
FIG. 9 is a flow chart illustrating the procedure of a cassette conveyance process.
Figure 10:
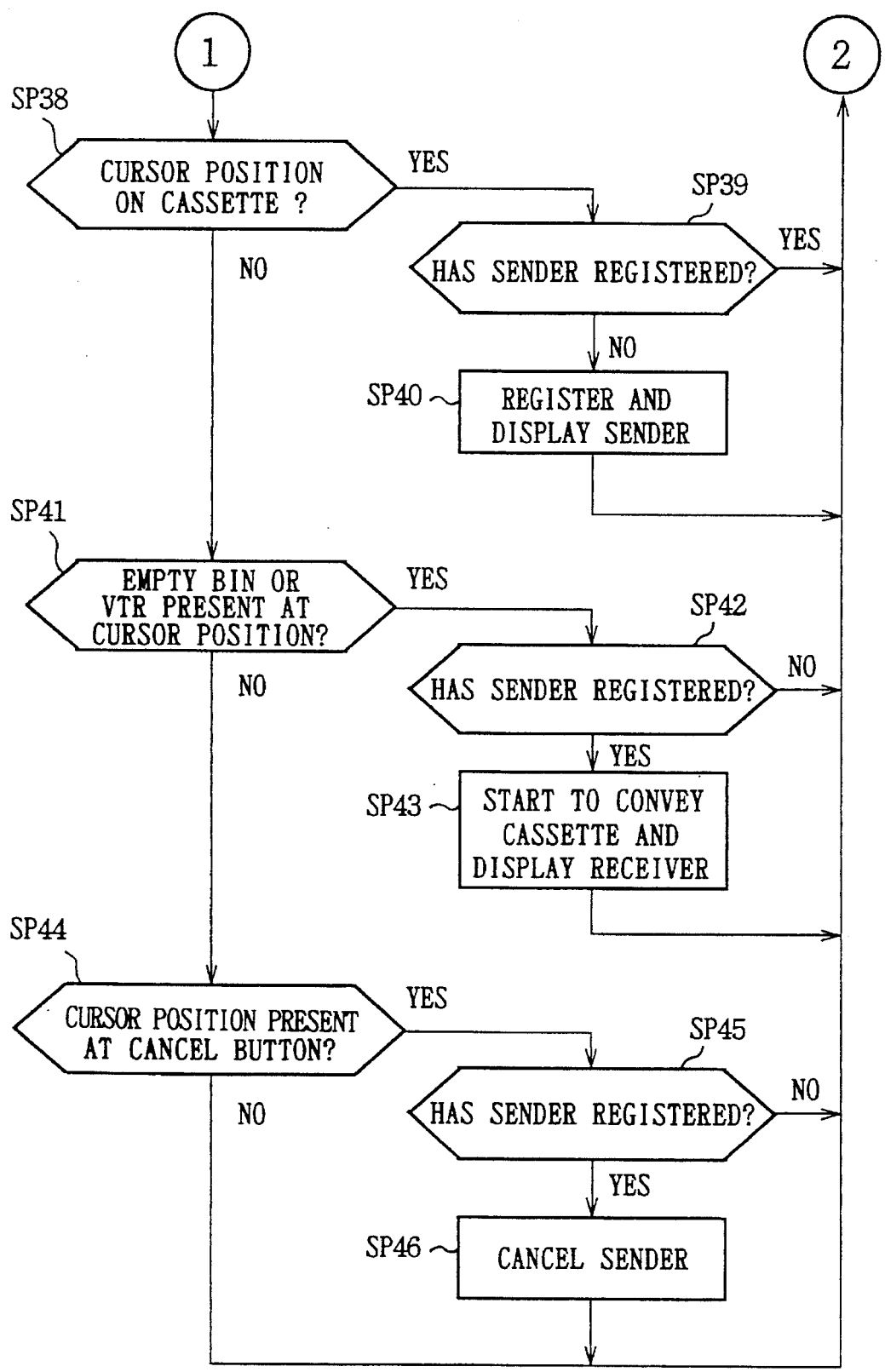
FIG. 10 is a flow chart illustrating the procedure of a cassette conveyance process procedure.

That is, FIGS. 9 and 10 show the procedure of the cassette conveyance control processing. The control portion 12B of the external control device 12 is brought into the cassette conveyance processing in step SP30, and discriminates in step SP31 whether or not the conveyance of the cassette has been completed.

If an affirmative result is obtained, it means a fact that the conveyance of the cassette between the cassette accommodating portion 13 and the VTRs 16A to 16D or between the respective bins of the cassette accommodating unit 13 or between the VTRs 16A to 16D has been completed. At this time, the control portion 12B proceeds to step SP32 in which the registrations of the sender and the receiver of the cassette are canceled, and then it proceeds to step SP33.

If a negative result is obtained in step SP31, it means a fact that the conveyance of the cassette has not been completed. At this time, the control portion 12B proceeds to step SP33 in which it discriminates whether or not cassette information (that is, information about whether or not the cassette is present) of the bin of the cassette accommodating unit 13 has changed.

If an affirmative result is obtained, it means a fact that the state where the cassette is accommodated in the cassette accommodating unit 13 has been changed. At this time, the control portion 12B proceeds to step SP34 in which the display on the bin display portion 40 displayed on the monitor 12A is updated to correspond to the change (that is, whether or not the cassette is present) of the cassette accommodation unit, and then the control portion 12B proceeds to step SP35.

Therefore, if the cassette has been accommodated in the bin of the cassette accommodating unit 13, the cassette character 42L or 42M or 42S is displayed at the corresponding position in the bin display portion 40 designating the bin. If the cassette has been taken out from the bin of cassette accommodating unit 13, the dashed-line character 43S designating that no cassette is present is displayed at the corresponding position in the bin display portion 40 designating the bin.

If a negative result is obtained in step SP33, it means a fact that the cassette accommodating state in the cassette accommodating unit 13 has not been changed. At this time, the control portion 12B proceeds to next step SP35 in which it discriminates whether or not cassette information (that is, information about a fact whether or not the cassettes have been loaded into the VTRs 16A to 16D) of the VTRs 16A to 16D has been changed.

If an affirmative result is obtained, it means a fact that the cassette accommodation states of the VTRs 16A to 16D have been changed. At this time, the control portion 12B proceeds to step SP36 in which the cassette loading state displays (that is, the colors of the VTR characters 51A to 51D) of the corresponding VTR characters 51A to 51D in the cassette control (VTR) display portion 50 are changed in accordance with the cassette loading state (whether or not the cassette is present), and it proceeds to step SP37.

If a negative result is obtained in step SP35, it means a fact that the cassette loading states (whether or not the cassette is present) of the VTRs 16A to 16D have not been changed. At this time, the control portion 12B proceeds to next step SP37 in which it discriminates whether or not the button of the mouse 12C has been depressed.

If a negative result is obtained, it means a fact that the user's instructing operation (click) by making use of the mouse 12C has not been performed. At this time, the control portion 12B returns to the foregoing step SP31. If an affirmative result is obtained, it means a fact that the user's instructing operation (click) by making use of the mouse 12C has been performed. At this time, the control portion 12B proceeds to next step SP38 in which it discriminates whether or not the position of the cursor 25 (FIG. 4) is on the cassette in the bin display portion 40 or the VTR display portion 50.

If an affirmative result is obtained, it means a fact that the user has moved the cursor 25 on to the cassette in the bin display portion 40 or the VTR display portion 50 of the monitor 12A or the cassette insertion port character and clicks it to instruct the receiver of the cassette. At this time, the control portion 12B discriminates in step SP39 whether or not the sender has been registered.

If an affirmative result is obtained, it means a fact that the instructed sender of the cassette has been registered. At this time, the control portion 12B returns to the foregoing step SP31. If a negative result is obtained, it means a fact that the instructed sender of the cassette has not been registered at this time, the control portion 12B proceeds to step SP40 in which the instructed sender is registered and the sender is displayed on a status display portion 68 (FIG. 4) on the monitor 12B. Further, the color of the contour of the cassette characters 42L, 42M, and 42S of the bin display portion 40 corresponding to the sender bin or the cassette insertion port character 52 of the VTR characters 51A to 51D is changed to, for example, red. Then, the control portion 12B returns to the foregoing step SP31.

If a negative result is obtained in step SP38, it means a fact that the user has not shifted the cursor 25 onto the bin display portion 40 or cassette insertion port character 52 of the VTR display portion 50 into which the cassette has been loaded on the monitor 12A. At this time, the control portion 12B proceeds to step SP41 in which it discriminates whether or not the cursor 25 is present on the dashed-line character 43S (FIG. 4) designating that no cassette is present or the cassette insertion port character 52 on the VTR display portion 50 into which no cassette has been loaded.

If an affirmative result is obtained, it means a fact that the user has instructed the bin or the VTR having no cassette. At this time, the control portion 12B proceeds to step SP42 in which a discrimination is made whether or not the sender has been registered.

If a negative result is obtained, it means a fact that the receiver has been instructed in a state where a sender has not been determined. At this time, the control portion 12B returns to the foregoing step SP31. If an affirmative result is obtained, it means a fact that the receiver bin or the VTR that has the cassette in a state where the sender has not been determined. At this time, the control portion 12B proceeds to step SP43 in which it conveys the cassette in accordance with data about the sender or receiver instructed in the foregoing processing step, and then it returns to step SP31.

If a negative result is obtained, it means a fact that the cursor 25 is not present on the cassette character or the bin having no cassette in the bin display portion 40 or the cassette insertion port character 52 in the VTR display portion 50 into which the cassette has been loaded or the insertion port character 52 into which no cassette has been loaded. At this time, the control portion 12B proceeds to next step SP44 in which it discriminates whether or not the cursor 25 is present on the character 68C designating cancellation.

If an affirmative result is obtained, the control portion 12B proceeds to step SP45 in which the receiver has been registered. If a negative result is obtained, it returns to the foregoing step SP31. If an affirmative result is obtained, cancellation of the sender is performed in step SP46, and then it returns to the foregoing step SP31.

If a negative result is obtained in step SP44, it means a fact that the cursor 25 is not positioned on any character concerning to the cassette conveyance process. At this time, the control portion 12B returns to the foregoing step SP31 in which it repeats the foregoing processing.

Thereby, the cassettes 31S, 31M, and 31L accommodated in the respective bins 13A to 13V (FIG. 2) of the cassette accommodating unit 13 and the cassettes loaded into the VTRs 16A to 16D (FIG. 1) can be conveyed between the bins and the VTRs, between bins of the cassette accommodating unit 13 and between VTRs 16A and 16D by user's click instruction of the senders and the receivers.

With the above configuration, the cassette auto changer 10 visually displays the cassette accommodating unit 13 and the VTRs 16A to 16D of the cassette auto changer main portion 11 on the monitor 12A of the external control device 12 as the bin display portion 40 and the VTR display portion 50. The cursor 25 moves to the cassette characters 42L, 42M, and 42S of the bin display portion 40, the dashed-line character 43S, and the VTR characters 51A to 51D of the VTR display portion 50 and clicks them to designate the sender and receiver in the cassette conveying, in order to convey the cassette from the designated sender to the receiver. Accordingly, the cassette can be conveyed easily only operating on the monitor 12A.

Further, since the state of conveying of the cassette can display on the monitor 12A each time, the state of conveying of the cassette can be confirmed easily.

(2-5) Control of Conveyance of Cassette by Operating Return Key on the Monitor

In the cassette auto changer 10, instructing and clicking of the return key characters (Return) 53 of the respective VTR characters 51A to 51D in the VTR display portion 50 (FIG. 4) displayed on the monitor 12A of the external control device by using the cursor 25 to cause a conveyance operation to be performed to return the cassettes loaded into the VTRs 16A to 16D in the cassette auto changer main portion 11 corresponding to the foregoing VTR characters 51A to 51D to the same bins 13A to 13V which have accommodated the foregoing cassettes before the cassettes are loaded into the VTRs 16A to 16D.

That is, the control portion 12B is arranged to temporarily store the position of the bin into the memory 12E, which is the sender of the cassette when the cassette is loaded into the VTR.

Figure 11:
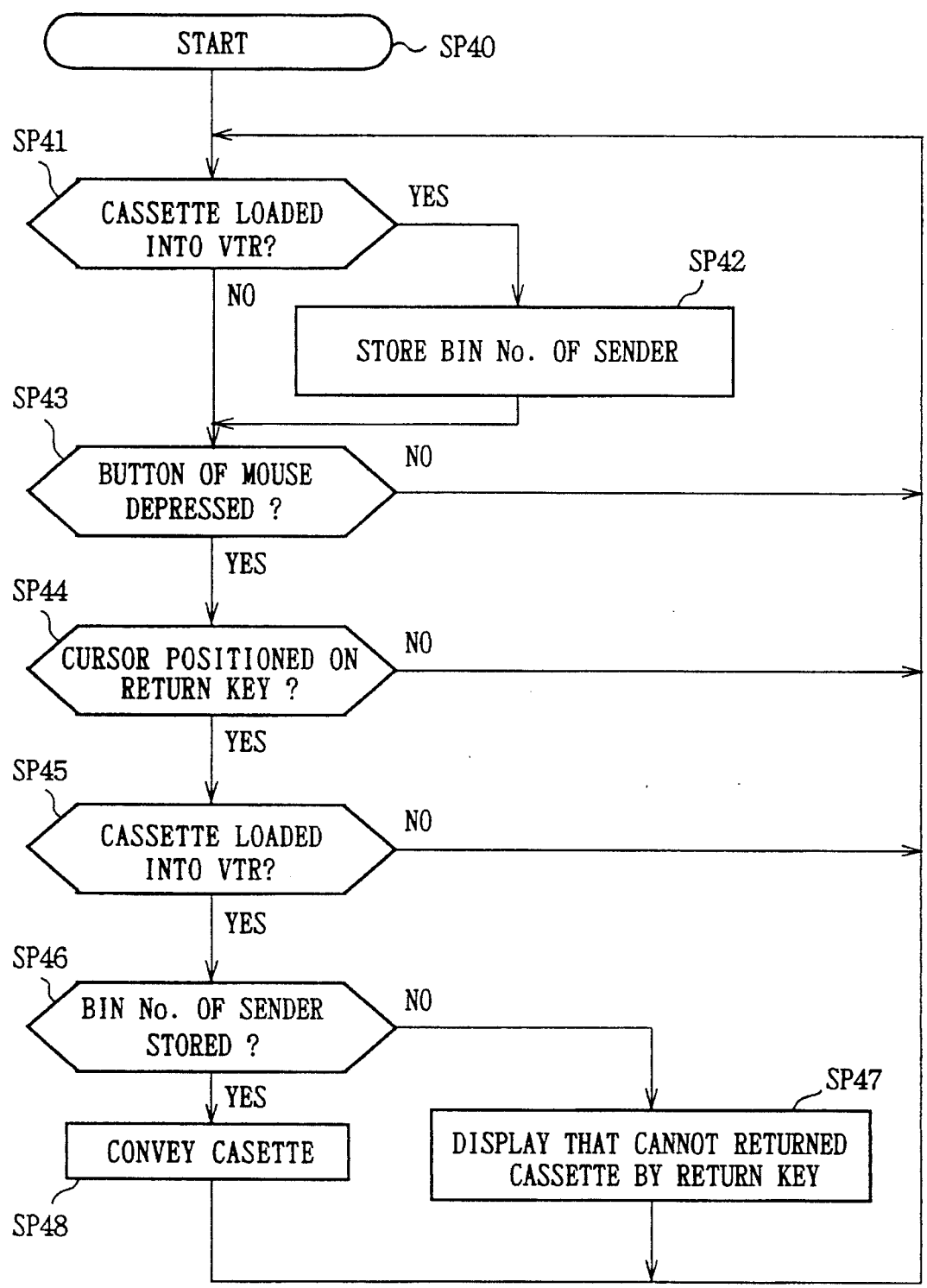
FIG. 11 is a flow chart illustrating the procedure of a cassette conveyance process with a return key.

FIG. 11 shows the procedure for controlling the conveyance of the cassettes by the return key characters 53 (FIG. 4). The control portion 12B of the external control device 12 is, in step SP40, brought into the cassette conveyance processing by using the return key characters. In step SP41, it discriminates whether or not the cassettes have been loaded into the VTRs 16A to 16D.

If an affirmative result is obtained, the control portion 12B proceeds to step SP42 in which it stores the bin No. which is the sender, and proceeds to step SP43. If a negative result is obtained in step SP41, the control portion 12B proceeds to step SP43 in which it discriminates whether or not the click button of the mouse 12C (FIG. 1) has been depressed.

If a negative result is obtained, the control portion 12B returns to step SP41 in which it repeats the similar process. If an affirmative result is obtained, the control portion 12B proceeds to step SP44 in which it discriminates whether or not the cursor 25 is positioned on the return key character 53 of the VTR characters 51A to 51D displayed on the monitor 12A.

If a negative result is obtained, the control portion 12B returns to step SP41 in which it repeats the similar process. If an affirmative result is obtained, it means a fact that the user has, by using the cursor 25, instructed any one of the VTRs 16A to 16D corresponding to the VTR characters 51A to 51D to perform the cassette return process. At this time, the control portion 12B proceeds to next step SP45 in which it discriminates whether or not the cassette has been loaded into the VTR (16A, 16B, 16C, or 16D) corresponding to the VTR character, the return key character of which has been clicked.

If a negative result is obtained, it means a fact that no cassette has been loaded into the VTR, which has been instructed to return the cassette. At this time, the control portion 12B returns to step SP41. If an affirmative result is obtained, the control portion 12B proceeds to step SP46 in which it discriminates whether or not the bin (FIG. 13A to 13V), in which the cassette loaded into the VTR has been accommodated has been recorded (that is the bin No. which is the sender).

If a negative result is obtained, it means a fact that the cassette cannot be conveyed to the bin even if the return key character 53 is instructed. At this time, the control portion 12B proceeds to step SP47 in which a fact that the cassette cannot be returned even if the return key character 53 is clicked is displayed at a predetermined display position, and then the control portion 12B returns to the foregoing step SP41.

If an affirmative result is obtained in step SP46, the control portion 12B proceeds to step SP48 in which it conveys the cassette loaded into the VTR, the return key character 53 of which has been operated, to the original bin, corresponding to the position data of the sender memorized in the memory 12E.

Thus, the user is needed to perform a simple operation of clicking the return key character 53 on the monitor 12A without instructing the sender and the receiver to return the cassette loaded into the VTR to the bin in which the cassette has been accommodated before the cassette is loaded into the VTR.

With the above configuration, the cassette auto changer 10 visually displays the cassette accommodating unit 13 of the cassette auto changer main portion 11 and the VTRs 16A to 16D onto the monitor 12A of the external control device 12 as the bin display portion 40 and the VTR display portion 50. The cursor 25 moves to the return key characters 53 of the VTR characters 51A to 51D of the VTR display portion 50, to click them, in order to send back into the sender bin.

Thereby, the operation same as it when operating actually the VTRs 16A to 16D can be executed only operating on the monitor 12A, thus the cassette can be sent back into the sender bin.

Further, the state of conveying of the cassette can be displayed on the monitor 12A each time, therefore, the state sending back the cassette can be confirmed easily.

In the cassette auto changer 10, the state of the connection of the switcher 20 and the channels that can be monitored and displayed at present on a switcher display portion 80 displayed on the monitor 12A of the external control device 12. Further, the operation of the cursor 25 enables the state of the connections of the switcher 20 to be switched.

That is, on the switcher display portion 80 shown in FIG. 4, input and output lines 20A and 20B (FIG. 1) for 12 channels are drawn while being formed into a matrix to correspond to the switcher 20 having 12 channels of input lines and output lines. Further, the channel Nos. of the respective input lines are displayed as in bus characters 82, while the channel Nos. of the output lines are displayed as out bus characters 81.

Further, connection points (cross points), at which the input and output lines are actually connected at the intersections of the channels of the input and output lines, are displayed with connection point characters 83. The output channels or the output channels, that can be monitored and displayed at present, are drawn with monitor line characters 84. In addition, the output channels allocated as the monitor lines are displayed on monitor line display portion 85.

Figure 12:
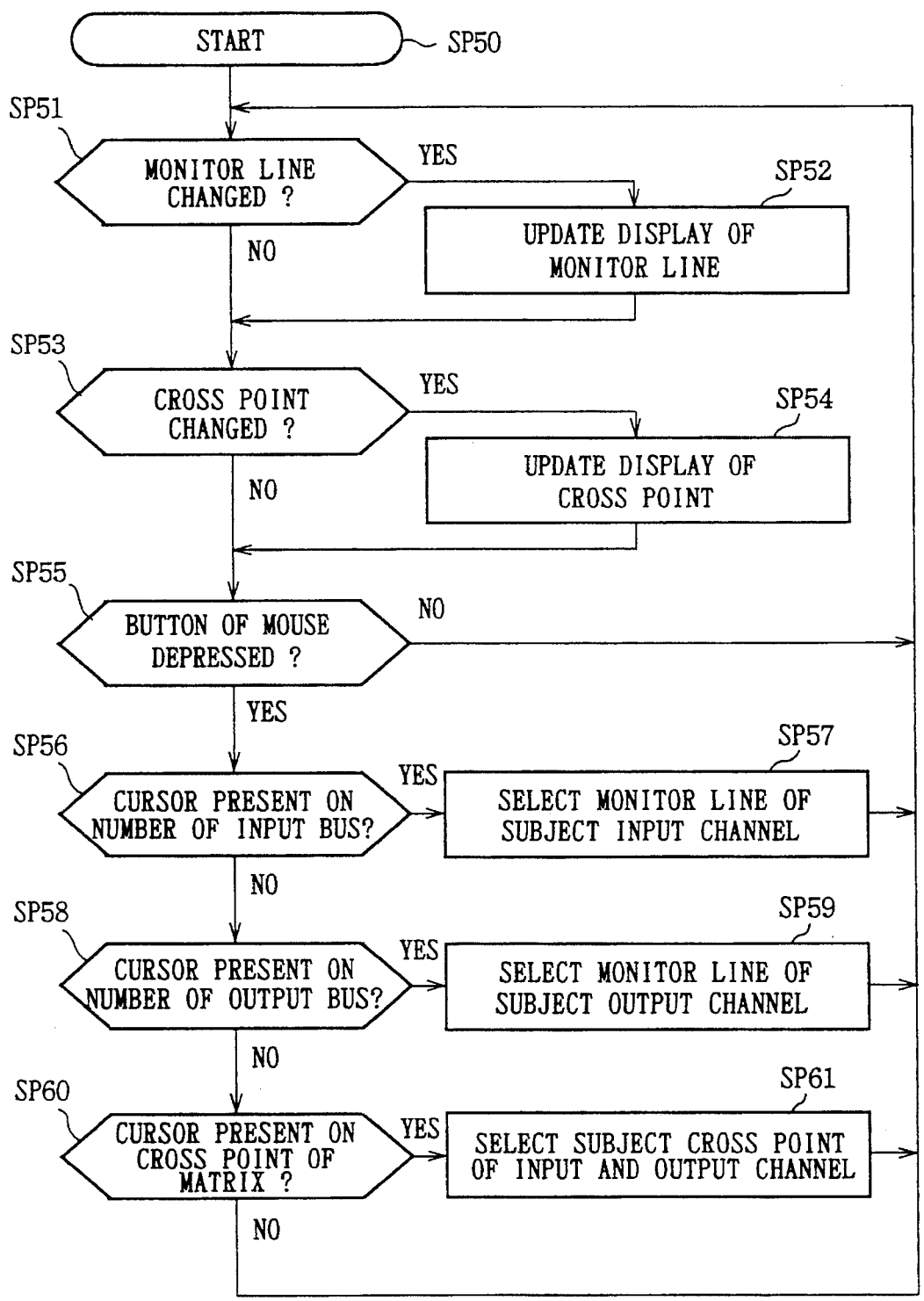
FIG. 12 is a flow chart illustrating the procedure of a switcher control and state display process.

FIG. 12 shows the procedure of controlling the switcher and that of a state display processing. The control portion 12B of the external control device 12, by way of step SP50, proceeds to step SP51 in which it discriminates whether or not the monitor lines of the switcher 20 (FIG. 1) have been changed.

If an affirmative result is obtained, the control portion 12B proceeds to step SP52 in which the monitor line character 84 is updated to a display position corresponding to the input or the output channel allocated to the monitor line in accordance with the change of the monitor line, and then it proceeds to step SP53. The monitor line character 84 shown in FIG. 4 corresponding to a case where a predetermined channel (channel No. 5) of the output line is set as the monitor line. In a case where a predetermined channel of the input line is set as the monitor line, the monitor line character is displayed on the output line perpendicular to the monitor line character 84 shown in FIG. 4.

If a negative result is obtained in step SP51, it means a fact that the monitor line has not been changed. At this time, the control portion 12B proceeds to next step SP53 in which it discriminates whether or not the connection point (the cross point) of the input and output lines of the switcher 20 has been changed.

If an affirmative result is obtained, the control portion 12B proceeds to step SP54 in which the display position of the connection point character 83 is updated to correspond to the change of the connection point. Then, the control portion 12B proceeds to step SP55. If a negative result is obtained in step SP53, it means a fact that the connection point has not been changed. At this time, the control portion 12B proceeds to next step SP55 in which it discriminates whether or not the click button of the mouse 12C has been depressed.

If a negative result is obtained, the control portion 12B return to the foregoing step SP51 in which it repeats the similar processing. If an affirmative result is obtained, the control portion 12B proceeds to next step SP56 in which it discriminates whether or not the cursor 25 (FIG. 4) displayed on the monitor 12A is present on the number of the input bus character 82 on the display screen of the monitor 12A.

If an affirmative result is obtained, it means a fact that the channel of the input line of the switcher corresponding to the number of the instructed input bus character 82 has been, as the monitor line, instructed by the user. At this time, the control portion 12B proceeds to step SP57 in which it selects and sets the channel of the instructed input line as the monitor line, and then it returns to the foregoing step SP51.

If a negative result is obtained in step SP56, the control portion 12B proceeds to next step SP58 in which it discriminates whether or not the cursor 25 (FIG. 4) displayed on the monitor 12A is positioned on the number of the output bus character 81 on the display screen of the monitor 12A.

If an affirmative result is obtained, it means a fact that the channel of the output line of the switcher corresponding to the number of the instructed output bus character 81 has, as the monitor line, been instructed by the user. At this time, the control portion 12B proceeds to step SP59 in which it selects and sets the instructed channel of the output line as the monitor line, and it returns to the foregoing step SP51.

If a negative result is obtained in step SP58, the control portion 12B proceeds to next step SP60 in which it discriminates whether or not the cursor 25 is positioned on the intersection of the input and output lines of the switcher display portion 80.

If an affirmative result is obtained, the control portion proceeds to step SP61 in which it selects and sets, as the connection point, the intersection of the input channel and the output channel instructed with the cursor 25, and then it returns to the foregoing step SP51.

If a negative result is obtained in step SP60, it means a fact that the cursor 25 is not positioned at which it controls the switcher 20. At this time, the control portion 12B returns to the foregoing step SP51.

Thereby, the user is able to, in the switcher display portion 80 displayed on the monitor 12A, set and change the state of the connection of the switch 20 and the monitor line. Further, the user is able to visually confirm the state of the connection and the state where the monitor line is set.

With the above configuration, the cassette auto changer 10 displays the input and output line of the switcher 20 on the matrix of the monitor 12A of the external control device 12 as the switcher display portion 80, as well as display the state of connection of the switcher 20, thereby, the user can confirm easily the state of connection of the switcher 20.

Further, the switching between connecting points is instructed directly to the switcher display portion 80 displayed on the monitor 12A by the cursor 25, by which the user can switch the connection of the switcher 20 while seeing the switcher display portion 80.

Accordingly, the confirming and switching of the state of connection of the switcher 20 can be executed at the same time.

(2-7) Control of Monitor Line and Display of State

In the cassette auto changer 10, a display mode can be set in which only setting of the monitor line 84 can be performed as well as the arrangement that the cassette auto changer 11 and the switcher 20 can be controlled and their states can be confirmed on the monitor 12A of the external control device 12. As a result, an error of a type in which the user erroneously interrupts or changes the operation of the cassette auto changer 10 by making use of a cursor 25 in the case where the cassette auto changer 10 is in an operation state can be prevented.

Figure 13:
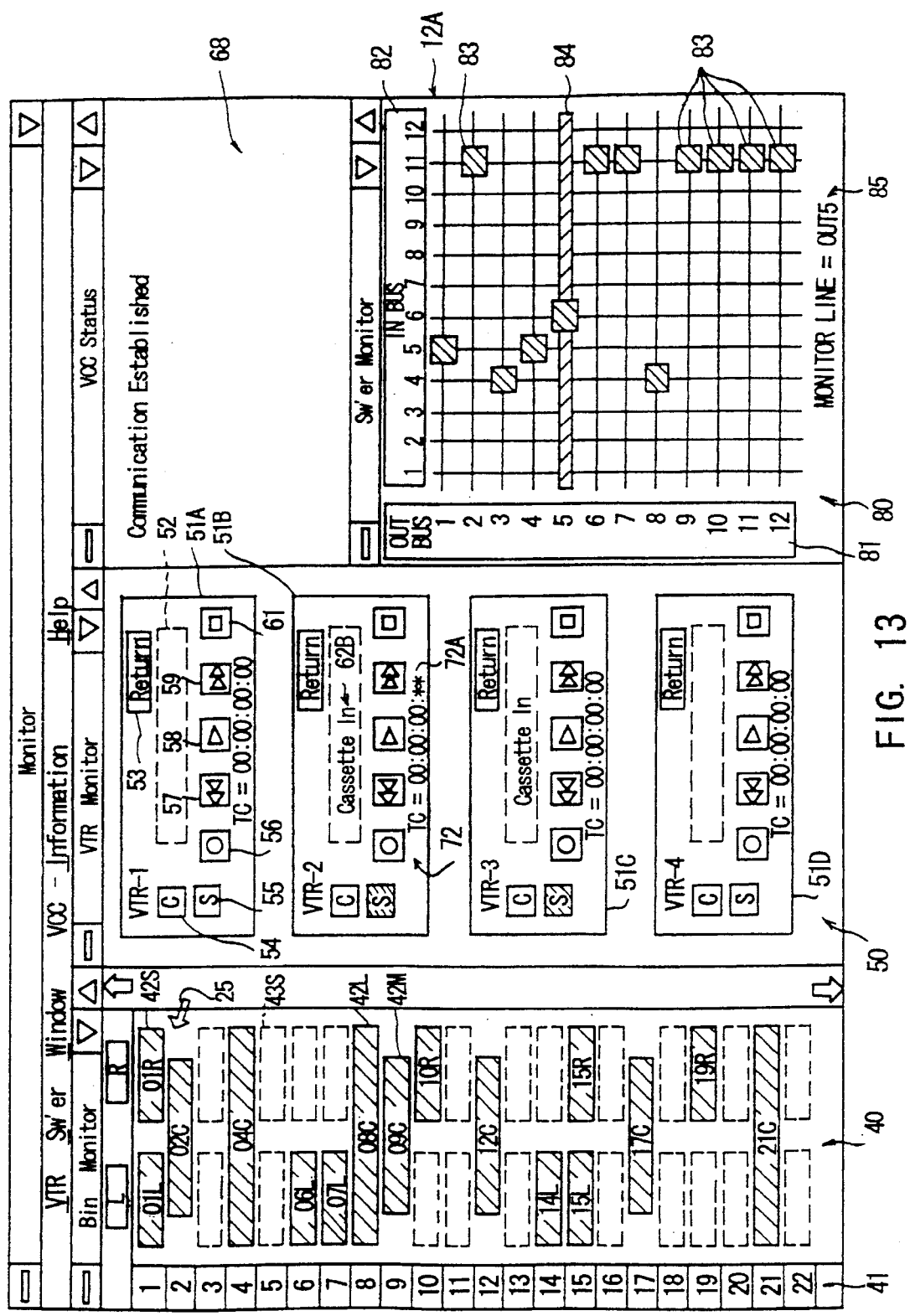
FIG. 13 is a schematic diagram showing an example of monitor display.

That is, FIG. 13 shows an example of a display made on the monitor 12A in which only setting of the monitor line 84 can be changed, in which if the cursor 25 in the bin display portion 40 and the VTR display portion 50 is operated by clicking, the corresponding cassette accommodating unit 13, the VTRs 16A to 16D and the cassette conveyance portion 14 (FIG. 1) cannot be controlled. In the switcher display portion 80, only setting of the monitor line of the switcher 20 can be changed.

Further, characters "Cassette In" 62B designating the loading state are displayed in the cassette insertion port character 52 of the VTR characters 51A to 51D corresponding to the VTRs 16A, 16B, 16C, or 16D into which the cassette has been loaded.

Figure 14:
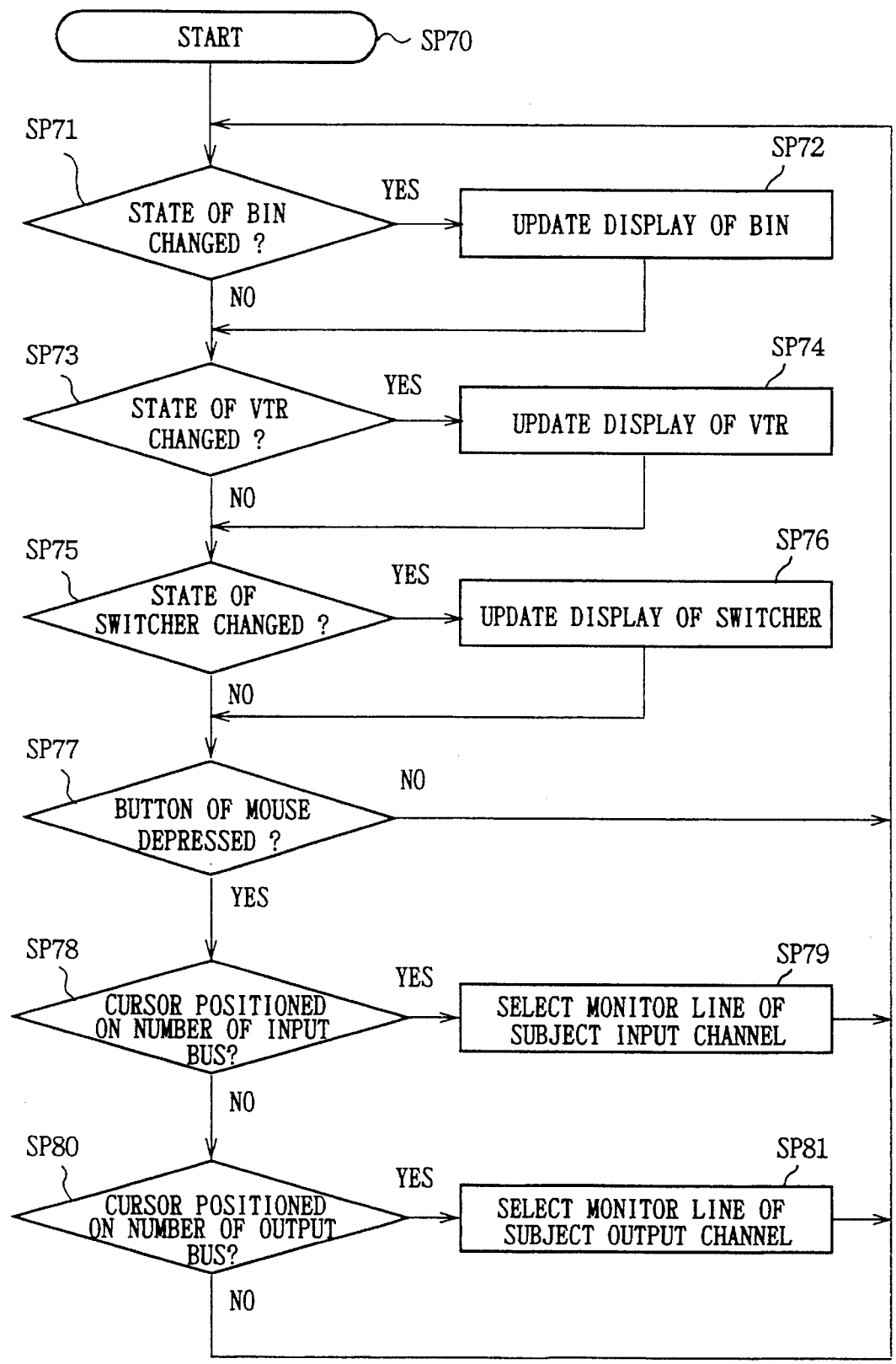
FIG. 14 is a flow chart illustrating the procedure of a switcher control and state display process.

FIG. 14 illustrates the procedure of control and state display processing of the monitor line in a state where only setting of the monitor line of the switcher 20 can be changed by the control portion 12B of the external control device 12. When the control portion 12B is instructed to realize the foregoing state, it makes a display as shown in FIG. 13 on the monitor 12A, and the control portion 12B proceeds to step SP71 by way of step SP70 as shown in FIG. 14.

The control portion 12B discriminates in step SP71 whether or not the cassette accommodation states (that is, whether or not the cassettes are present) in the bins 13A to 13V in the cassette accommodating unit 13 (FIG. 1) have been changed. If an affirmative result is obtained, it proceeds to step SP72 in which the display of the bin display portion 40 (FIG. 13) displayed on the monitor 12A is updated in accordance with the change of the cassette accommodation state, and the control portion 12B proceeds to step SP73.

If a negative result is obtained in the step SP71, the control portion 12B proceeds to step SP73 in which it discriminate whether or not the states of the VTRs 16A to 16D have been changed. If an affirmative result is obtained, the control portion 12B proceeds to step SP74 in which the display mode in the VTR display portion 50 (FIG. 13) displayed on the monitor 12A is updated in accordance with the change in the states of the VTRs 16A to 16D, and the control portion 12B proceeds to step SP75.

If a negative result is obtained in step SP73, the control portion 12B proceeds to step SP75 in which it discriminates whether or not the state (that is, the state of the connection or the state of the monitor line) of the switcher 20 has been changed. If an affirmative result is obtained, the control portion 12B proceeds to step SP76 in which the display made in switcher display portion 80 (FIG. 13) displayed on the monitor 12A is updated in accordance with the change of the state of the connection of the switcher 20 and setting of the monitor line. Then, the control portion 2B proceeds to step SP77.

If a negative result is obtained in step SP75, the control portion 12B proceeds to step SP77 in which it discriminates whether or not the click button of the mouse 12C (FIG. 1) has been depressed. If a negative result is obtained, the control portion 12B returns to the foregoing step SP71 in which the similar processing is repeated.

If an affirmative result is obtained in step SP77, the control portion 12B proceeds to next step SP78 in which it discriminates whether or not the cursor 25 (FIG. 13) displayed on the monitor 12A is positioned on the number of the input bus character 82 in the switcher display portion 80 (FIG. 13). If an affirmative result is obtained, it means a fact that the user has instructed the channel of the input line of the switcher 20 corresponding to the instructed number in the input bus character 82 has been instructed as the monitor line. At this time, the control portion 12B proceeds to step SP79 in which it selects and sets the instructed channel of the input line, and then it return to the foregoing step SP71.

If a negative result is obtained in step SP78, the control portion 12B proceeds to step SP80 in which it discriminates whether or not the cursor 25 (FIG. 13) displayed on the monitor 12A is, on the display screen (FIG. 13) of the monitor 12A, positioned on the number of the output bus character 81.

If an affirmative result is obtained, it means a fact that the channel of the output line of the switcher 20 corresponding to the instructed number in the output bus character 81 has been instructed by the user as the monitor line. At this time, the control portion 12B proceeds to step SP81 in which it selects and sets the instructed channel of the output line as the monitor line, and it returns to the foregoing step SP71.

As described above, the foregoing monitor line control and the state process procedures are so arranged that the user is able to instruct only the process of changing setting of the monitor line of the switcher 20. When the cassette auto changer 10 is performing the operation in accordance with, for example, a reproduction or an image recording list, which has been programmed previously, the erroneous input of an instruction by the user that interrupts the foregoing operation can be prevented.

Figure 15:
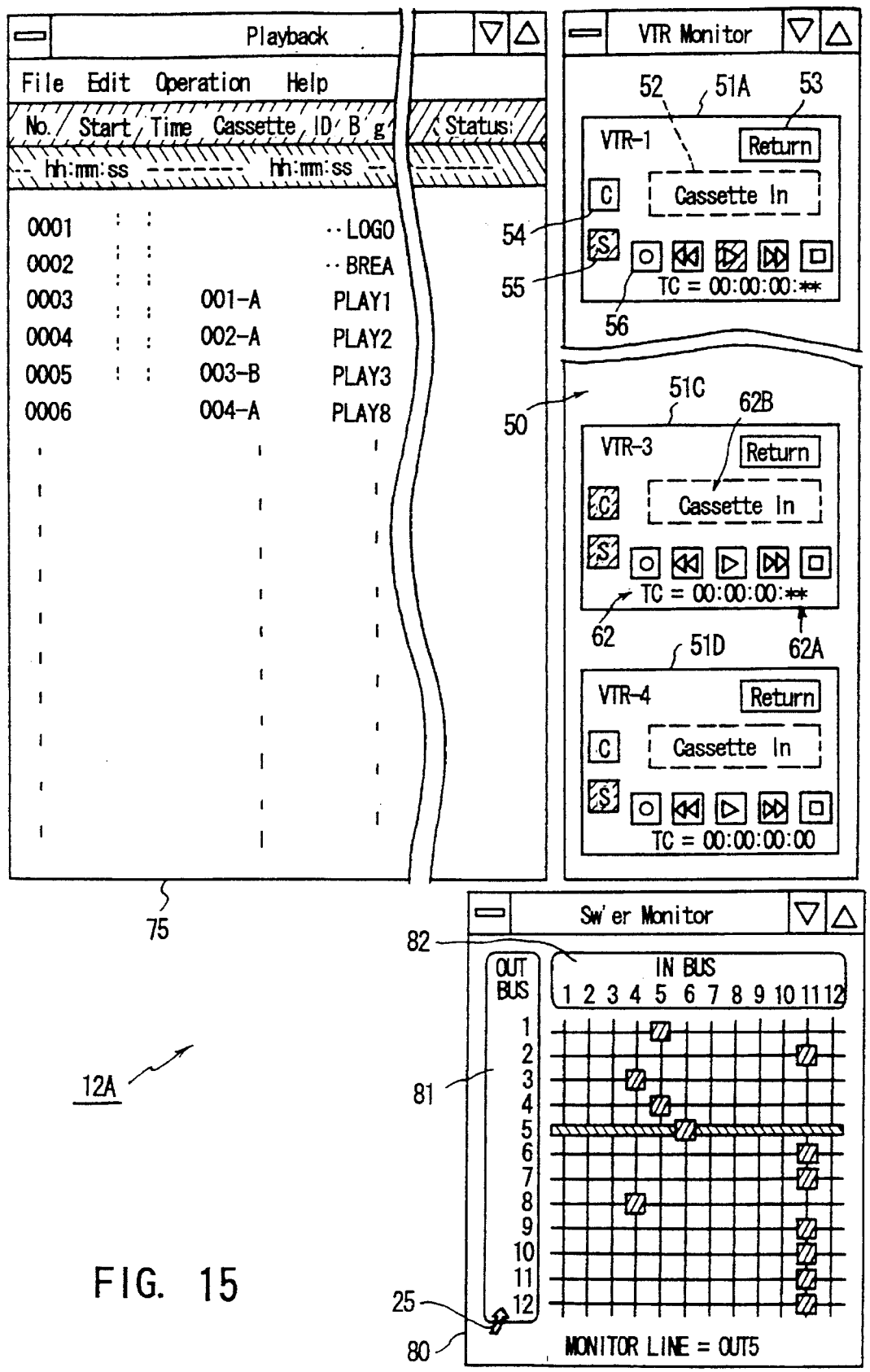
FIG. 15 is a schematic diagram showing an example of display to be performed in a case where a program transmission operation list and state of the cassette auto changer are displayed simultaneously.

FIG. 15 shows an example of display made on the monitor 12A when the cassette auto changer 10 is performing the reproduction operation in accordance with the reproduction list (a playback list) which has been programmed previously, in which the cassette display portion 50 and the switcher display portion 80 are displayed together with the reproduction list 75.

The user is able to instruct only setting of the monitor line on the foregoing display screen by making use of the cursor 25. Further, even if the connection point of the input and output lines of the switcher display portion 80 and the VTR display portion 50 are clicked by making use of the cursor 25, the operation of the cassette auto changer 10 cannot be changed. As a result, the erroneous operation of a type that the operation is erroneously interrupted or changed can be prevented.

With the above configuration, when the cassette auto changer 10 is in the operation state of for example, recording or reproducing or the like, the cassette auto changer 10 does not change the operation itself corresponding to the display screen of the monitor 12A (FIG. 13), to operate only setting of the monitor line. It can be prevent previously errors, such as stopping or changing of the operation of the cassette auto changer 10 due to click the display screen by the user, etc.

(2-8) Control of Switcher and Setting of State Display Portion

In the cassette auto changer 10, setting data for controlling the switcher 20 can be, on the monitor 12A of the external control device 12, changed in accordance with the configuration such as the number of the channels of the input and output lines of the switcher 20. Further, setting of the switcher display portion 80 can be performed.

Figure 16:
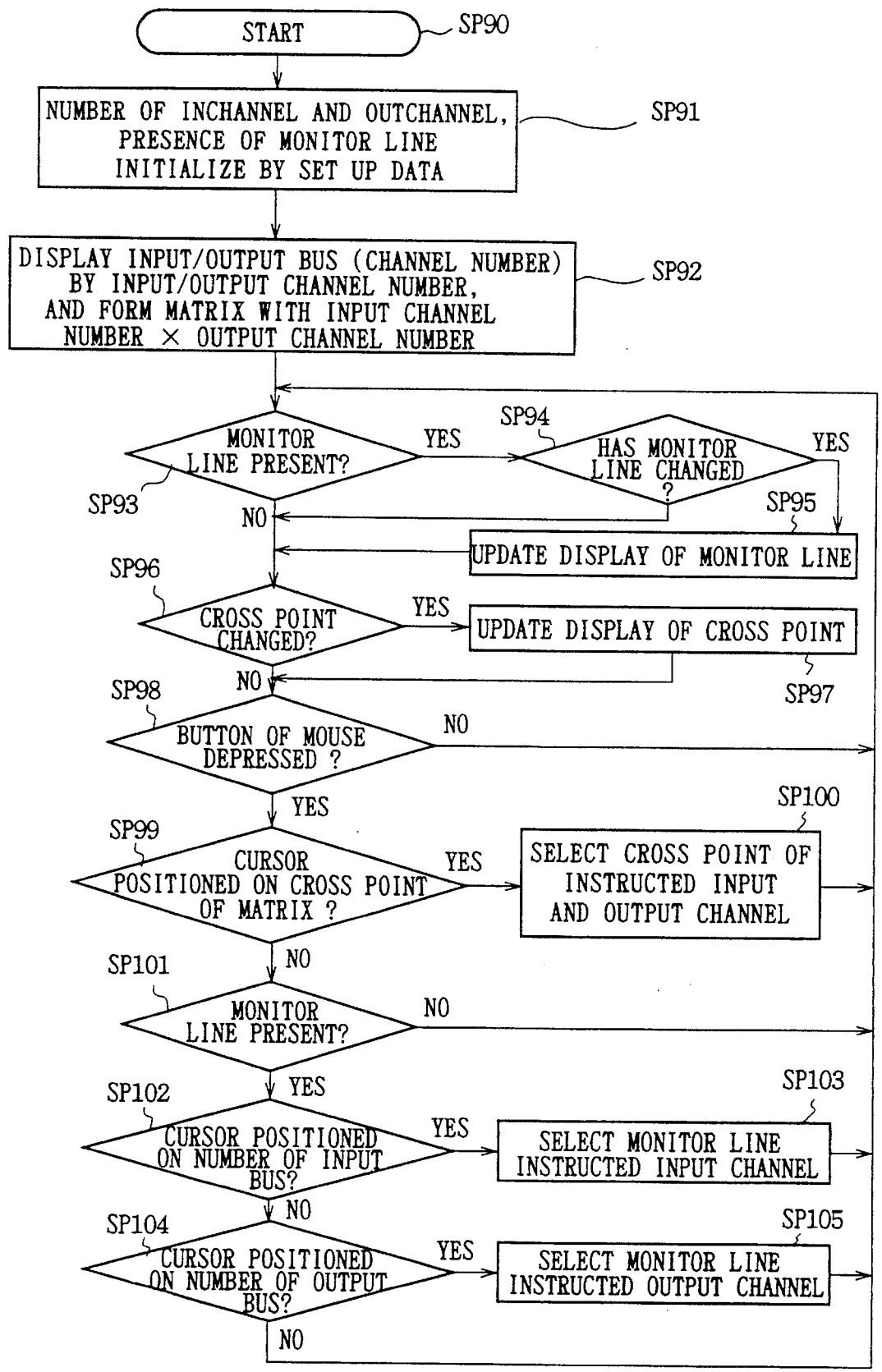
FIG. 16 is a flow chart which illustrates the procedure of the switcher control and state display portion setting process.

That is, when the processing of setting the switcher 20 has been instructed, the control portion 12B of the external control device 12 is brought into the switcher control and the state display portion setting processing as shown in FIG. 16 in accordance with the change of the data for setting the switcher 20. In step SP91, the number of the input channels of setting data (set up data), the number of the output channels and whether or not the monitor line is present are input as input data by the key board 12D to initialize it. In next step SP92, the control portion 12B displays, on the switcher display portion 80 (FIG. 13) of the monitor 12A, the input bus character 82 and the output bus character 81 corresponding to the number of the input channels and that of the output channels in accordance with the data for setting the switcher 20. Further, it forms a matrix display corresponding to the number of the channels on the foregoing switcher display portion 80.

Then the control portion 12B discriminates in next step SP93 whether or not the monitor line is present in the switcher 20. If an affirmative result is obtained, the control portion 12B proceeds to step SP94 in which it discriminates whether or not the monitor line has been changed.

If an affirmative result is obtained, the control portion 12B proceeds to step SP95 in which it updates the monitor line display made in the switcher display portion 80 is updated to a novel position. Then, the control portion 12B proceeds to step SP96. If a negative result is obtained in step SP93 and step SP94, the control portion 12B proceeds to step SP96 in which it discriminates whether or not the connection point (the control point) of the switcher 20 has been changed.

If an affirmative result is obtained, it means a fact that the connection point has been changed by the user. At this time, the control portion 12B proceeds to step SP97 in which the display position of the connection point character 83 in the switcher display portion 80 is updated in accordance with the change of the connection point, and the control portion 12B proceeds to step SP98.

If a negative result is obtained in step SP96, the control portion 12B proceeds to next step SP98 in which it determined whether or not the click button of the mouse 12C has been depressed.

If a negative result is obtained, the control portion 12B returns to the foregoing step SP93 in which it repeats the similar processing. If an affirmative result is obtained in step SP98, the control portion 12B proceeds to next step SP99 in which it discriminates whether or not the cursor 25 is positioned on the intersection of the matrix (the intersection of the input and output lines) in the switcher display portion 80.

If an affirmative result is obtained, it means a fact that the user has instructed the connection point of the switcher 20. At this time, the control portion 12B proceeds to step SP100 in which it selects and sets the instructed connection point, and then it returns to the foregoing step SP93 in which it repeats the similar processing.

If a negative result is obtained in step SP99, it means a fact that the user has not instructed the connection point of the switcher 20. At this time, the control portion 12B proceeds to next step SP101 in which it discriminates whether or not the monitor line is present in the switcher 20.

If a negative result is obtained, the control portion 12B returns to the foregoing step SP93 in which it repeats the similar processing. If an affirmative result is obtained, the control portion 12B proceeds to step SP102 in which it discriminates whether or not the cursor 25 (FIG. 4) displayed on the monitor 12A is present on the number in the input bus character 82 on the display screen of the foregoing monitor 12A.

If an affirmative result is obtained, it means a fact that the user has instructed, as the monitor line, the channel of the output line of the switcher 20 corresponding to the instructed number in the input bus character 82. At this time, the control portion 12B proceeds to step SP103 in which it selects and sets the instructed channel of the input line as the monitor line, and it returns to the foregoing step SP93.

If a negative result is obtained in step SP102, the control portion 12B proceeds to next step SP104 in which it discriminates whether or not the cursor 25 (FIG. 4) displayed on the monitor 12B is present on the number in the output bus character 81 on the display screen of the monitor 12A.

If an affirmative result is obtained, it means a fact that the user has instructed, as the monitor line, the channel of the output line of the switcher 20 corresponding to the instructed number in the out bus character 81. At this time, the control portion 12B proceeds to step SP105 in which it selects and sets the instructed channel of the output line as the monitor line, and it returns to the foregoing step SP93.

If a negative result is obtained in step SP104, it means a fact that the user has not instructed setting of the monitor line. At this time, the control portion 12B returns to the foregoing step SP93 in which it repeats the similar processing.

As described above, if the structure of the switcher 20, such as the numbers of the input and output channels, has been changed, the switcher control and the state display setting processing are performed in accordance with the data for setting the switcher 20. Further, the switcher display 80 to be displayed on the monitor 12A is updated to a novel display to corresponding to the changed configuration. As a result, even if the switcher 20 has been changed variously, the state of the switcher 20 changed on the monitor 12A can be displayed as the switcher display portion 80. Further, the clicking operation of the cursor 25 performed in the switcher display portion 80 enables the connection point of the switcher 20 and the monitor line to be set to various positions.

Figure 17:
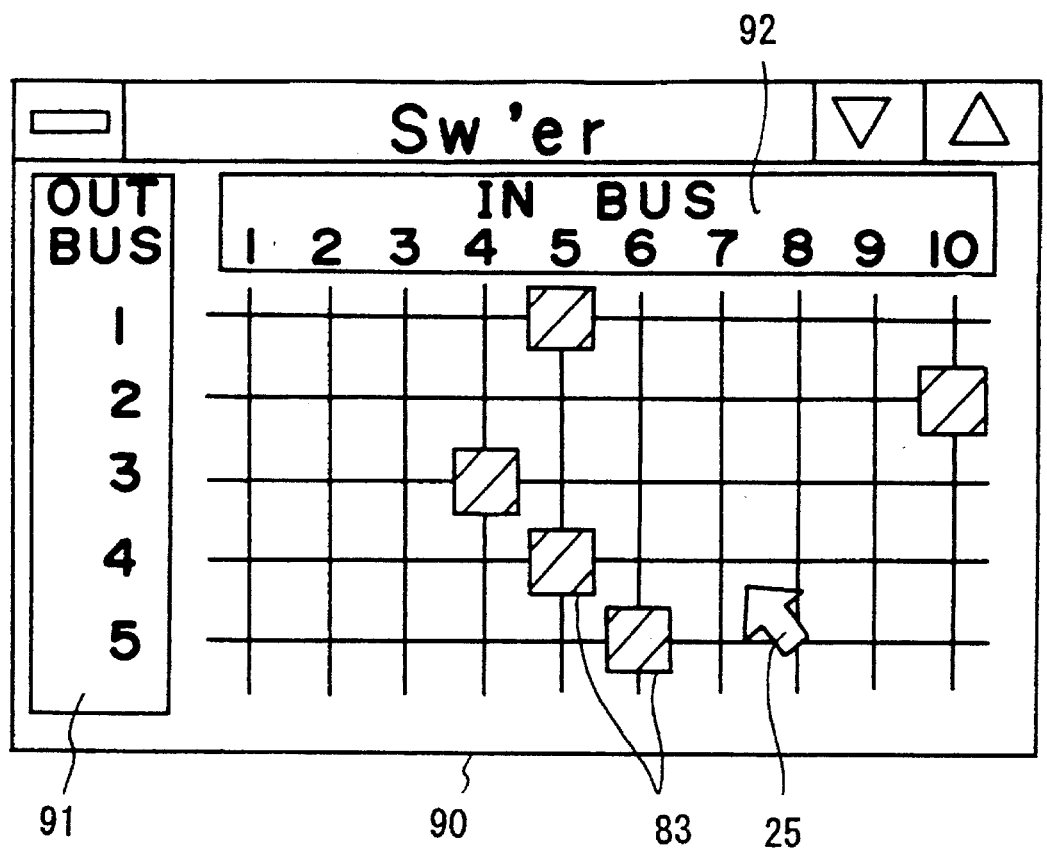
FIG. 17 is a schematic diagram showing an example of the switcher control and the state display.

Therefore, if the switcher 20, arranged such that the number of the channels of the input line is, for example, 10 and the number of the channels of the output line is 5, is used, a switcher display portion 90 is displayed on the monitor 12A as shown in FIG. 17. Further, the input bus character 92 and the output bus character 91 are displayed as the corresponding characters to correspond to the number of the input and output channels.

With the above configuration, the setting data of the switcher 20 is changed corresponding to the configuration of the switcher 20 (that is, existence of number of the input and output line and the monitor line). Thereby, the switcher display portion 80 corresponding to the configuration of the switcher 20 can be displayed on the monitor 12A according to various configuration of switchers.

Accordingly, since specific control soft is not needed to each of switchers having different configuration, by a simple method for only changing the setting data, control of the switcher 20 in the display of the switcher display portion 80 corresponding to various switchers 20 and on the display screen can be performed.

(2-9) Time Code Display Process

In the cassette auto changer 10, the time codes sequentially recorded on the recording mediums (magnetic tapes) in the cassettes loaded in the VTRs 16A to 16D (FIG. 1) corresponding to the respective VTR characters 51A to 51D in the VTR display portion 50 (FIGS. 4 and 13) displayed on the monitor 12A of the external control device 12 are sequentially displayed in a time code display portion 72 in accordance with the position at which the recording medium is running.

Figure 18:
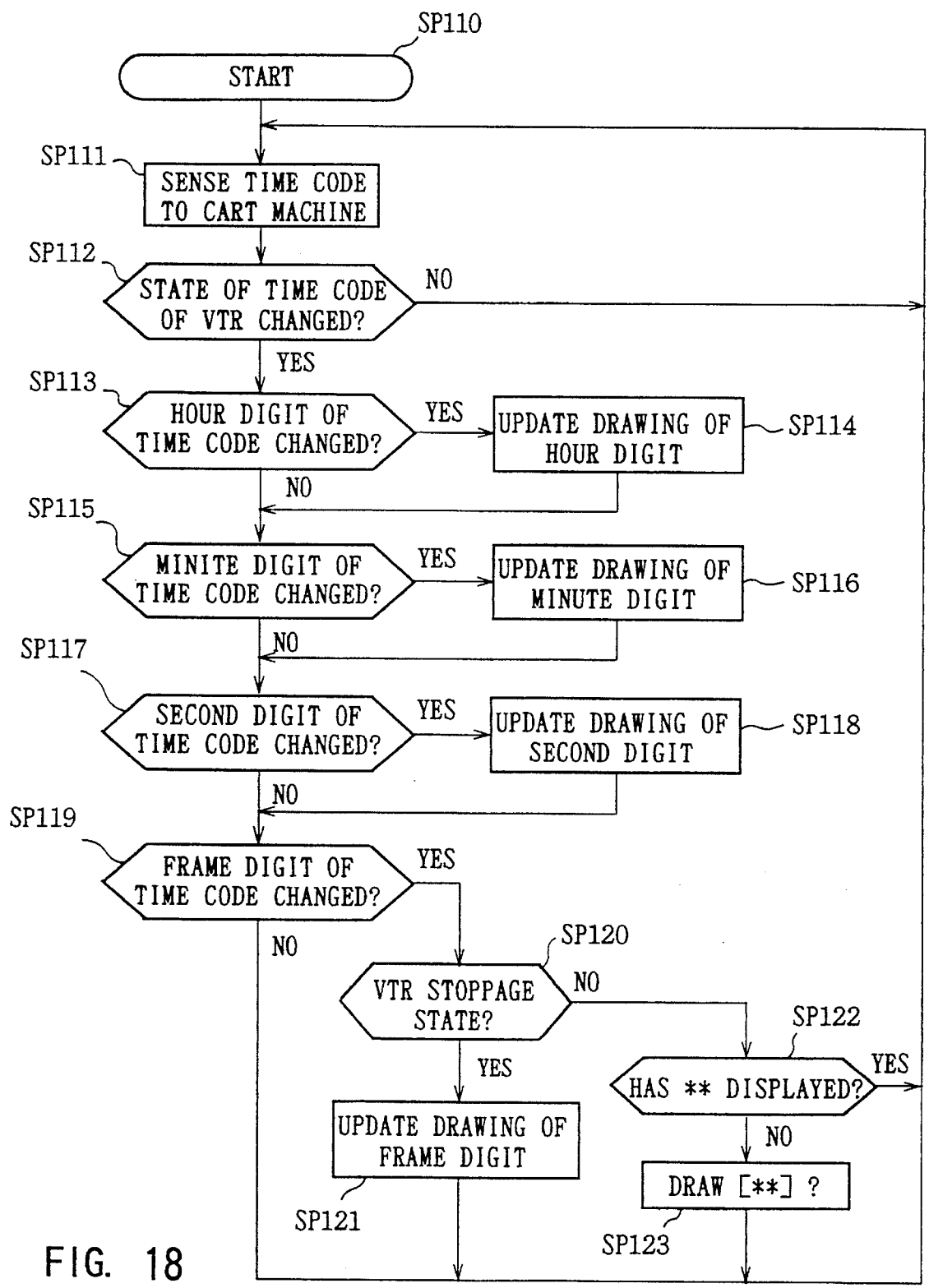
FIG. 18 is a flow chart illustrating the procedure of a time code display process.

That is, when the control portion 12B of the external control device 12 is instructed to perform a mode for displaying the VTR display portion 50 on the monitor 12A, it is brought into a time code display processing shown in FIG. 18. In step SP111, it reads the current time codes of the cassettes loaded into the VTRs 16A to 16D in the cassette auto changer (a cart machine).

Then, the control portion 12B proceeds to next step SP112 in which it discriminates whether or not the time codes of the VTRs 16A to 16D have been changed. If a negative result is obtained, the control portion 12B returns to the foregoing step SP111 in which it repeats the similar processing.

If an affirmative result is obtained in step SP112, the control portion 12B proceeds to next step SP113 in which it discriminates whether or not the hour digit of the time code has been changed. If an affirmative result is obtained, the control portion 12B proceeds to step SP114 in which it updates drawing of the hour digit of the time code display portion 72 of each of the VTR characters 51A to 51D, and then it proceeds to step SP115.

If a negative result is obtained in step SP113, the control portion 12B proceeds to next step SP115 in which it discriminates whether or not the minute digit of the time code has been changed.- If an affirmative result is obtained, the control portion 12B proceeds to step SP116 in which it updates drawing of the minute digit of the time code display portion 62 of each of the corresponding VTR characters 51A to 51D, and it proceeds to step SP117.

If a negative result is obtained in step SP115 in which the control portion 12B proceeds to next step SP117 in which it discriminates whether or not the second digit of the time code has been changed. If an affirmative result is obtained, the control portion 12B proceeds to step SP118 in which it updates drawing of the second digit of the time code display portion 62 of each of the corresponding VTR characters 51A to 51D, and it proceeds to step SP119.

If a negative result is obtained in step SP117, the control portion 12B proceeds to next step SP119 in which it discriminates whether or not the frame digit of the time code has been changed. If an affirmative result is obtained, the control portion 12B proceeds to step SP120 in which it discriminates whether or not the corresponding VTR is in a stoppage state.

If an affirmative result is obtained, the control portion 12B proceeds to step SP121 in which it updates drawing of the frame digit of the time code display portion 72, and it returns to the foregoing step SP111 in which it repeats the similar processing. Therefore, if the VTRs 16A to 16D are changed from the running state to the stoppage state, the frame digit of the time code display portion 72 is displayed. Therefore, when the user visually confirms the number of the frame digits, the user discriminates that the corresponding VTRs 16A to 16D are in the stoppage state.

If a negative result is obtained in step SP120, it means a fact that the corresponding VTRs 16A to 16D are in the running state. At this time, the control portion 12B is, in step SP122, discriminates whether or not an abbreviation symbol 72A (FIG. 13) has been displayed in the frame digit of the time code display portion 72. If an affirmative result is obtained, the control portion 12B returns to the foregoing step SP111 in which the similar processing is repeated.

If a negative result is obtained in step SP122, the control portion 12B proceeds to next step SP123 in which it draws the abbreviation symbol 72A in the frame digit of the time code display portion 72, and then it returns to the foregoing step SP111 in which it repeats the similar processing. If the VTRs 16A to 16D are in the running state, the frame digit of the time code display portion 72 is changed to the abbreviation symbol 72A. Therefore, the user visually confirms the abbreviation symbol 72A so that the user discriminates that the corresponding VTRs 16A to 16D are in the running state.

If a negative result is obtained in step SP119, it means a fact that the time code has not been changed and the corresponding VTRs 16A to 16D maintain the stoppage state. At this time, the control portion 12B returns to the-foregoing step SP111 in which it repeats the similar process.

If the VTRs 16A to 16D are in the running state, precise information such as the frame digit is not needed as the time coded. If the VTRs 16A to 16D are in the stoppage state (introduction scanning), precise information including the frame digit is required as the time code data. By utilizing the foregoing facts, the frame digit of the corresponding time code display portion 72 is displayed if the VTRs 16A to 16D are in the running state. If the VTRs 16A to 16D are stopped, the frame digit of the corresponding time code display portion 72 is changed to the abbreviation symbol 72A. As a result, the user visually confirms the time code display portion 72 on the monitor 12A so that the user is able to discriminate easily a fact that the corresponding VTRs 16A to 16D are in the running state or the stoppage state.

With the above configuration, the cassette auto changer 10 displays the VTR characters 51A to 51D corresponding to the VTRs 16A to 16D on the monitor 12A of the external control device 12, as well as display the time codes of recording mediums (magnetic tape) in the cassettes which are loaded into corresponding VTRs 16A to 16D respectively. Thereby, the user can easily confirm the time codes.

Further, in the running state of the magnetic tape of the cassette, since the frame digit of the time code is not displayed, and when stopping the magnetic tape, the frame digit of the time code is displayed, so that detection intervals of the time code which is executed toward the VTRs 16A to 16D by the internal control device 17, is extended (every about 1 seconds). Thereby, sending and receiving of the time code data can be executed with lower speed comparatively.

Furthermore, only when stopping it, the frame digit of the time code is displayed in order to easily confirm the stoppage state of the magnetic tape by the user.

(4) Other Embodiments

Although the foregoing embodiment has been so arranged that this invention is applied to the cassette auto changer, into which the cassettes 31L, 31M, and 31S recorded in accordance with the same format and having three different sizes are loaded in a mixed manner. However, this invention is not only limited to this, but may be applied to a cassette auto changer into which cassettes recorded in accordance with different formats are loaded in a mixed manner.

Figure 19:
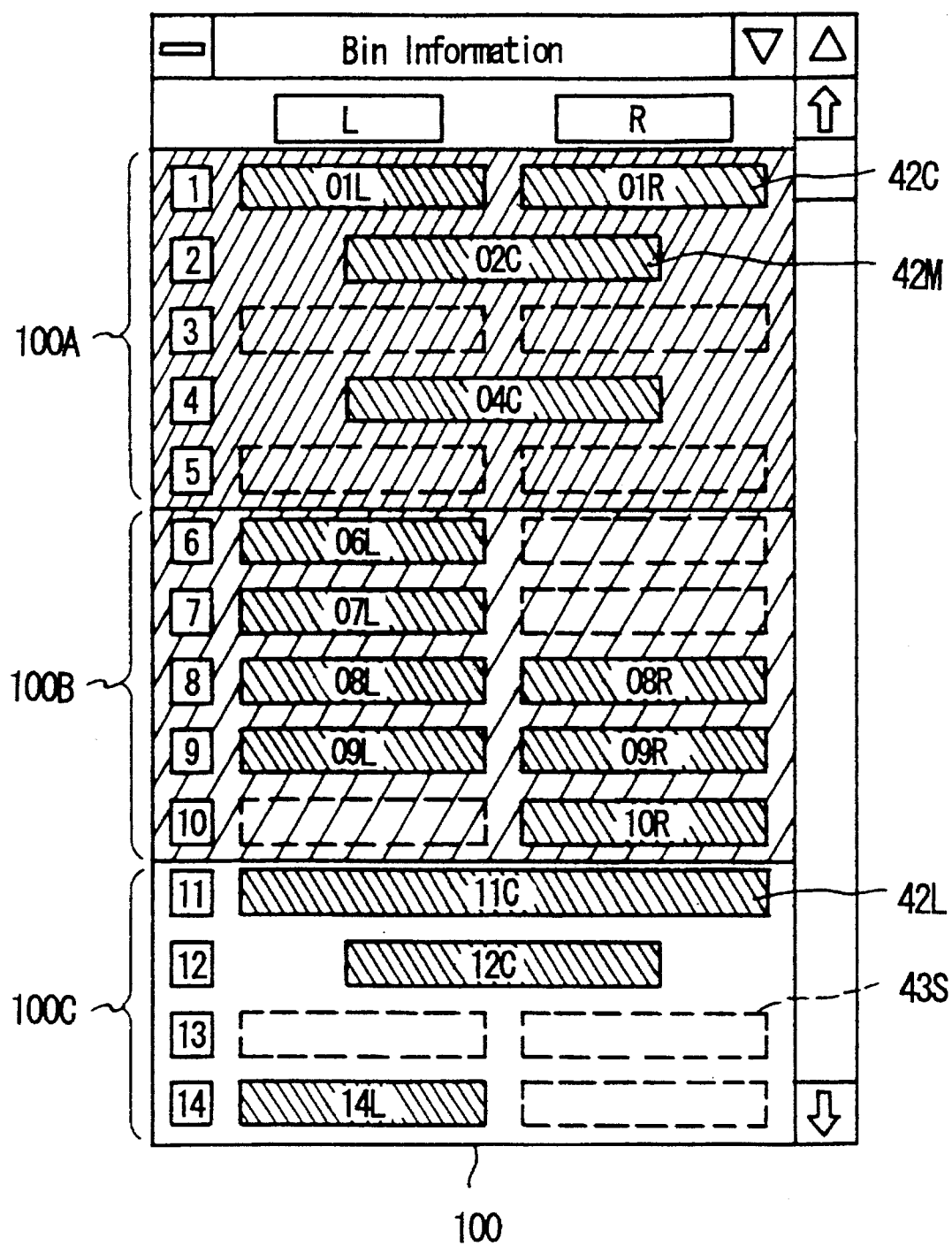
FIG. 19 is a schematic diagram showing a bin display portion according to another embodiment.

In this case where, for example, three types of cassettes having different recording formats and different sizes are loaded in a mixed manner, the bin display on the monitor 12A may be performed such that a bin display portion 100 as shown in FIG. 19 is displayed.

That is, the bin display portion 100 draws unit display portions 100A, 100B, and 100C for each of the bins that accommodate the cassette having the same recording format to correspond to the cassette accommodating portion of the cassette auto changer. Further, the backgrounds of the respective unit display portions 100A, 100B, and 100C are colored respectively to enable the user to discriminate the backgrounds.

Figure 20:
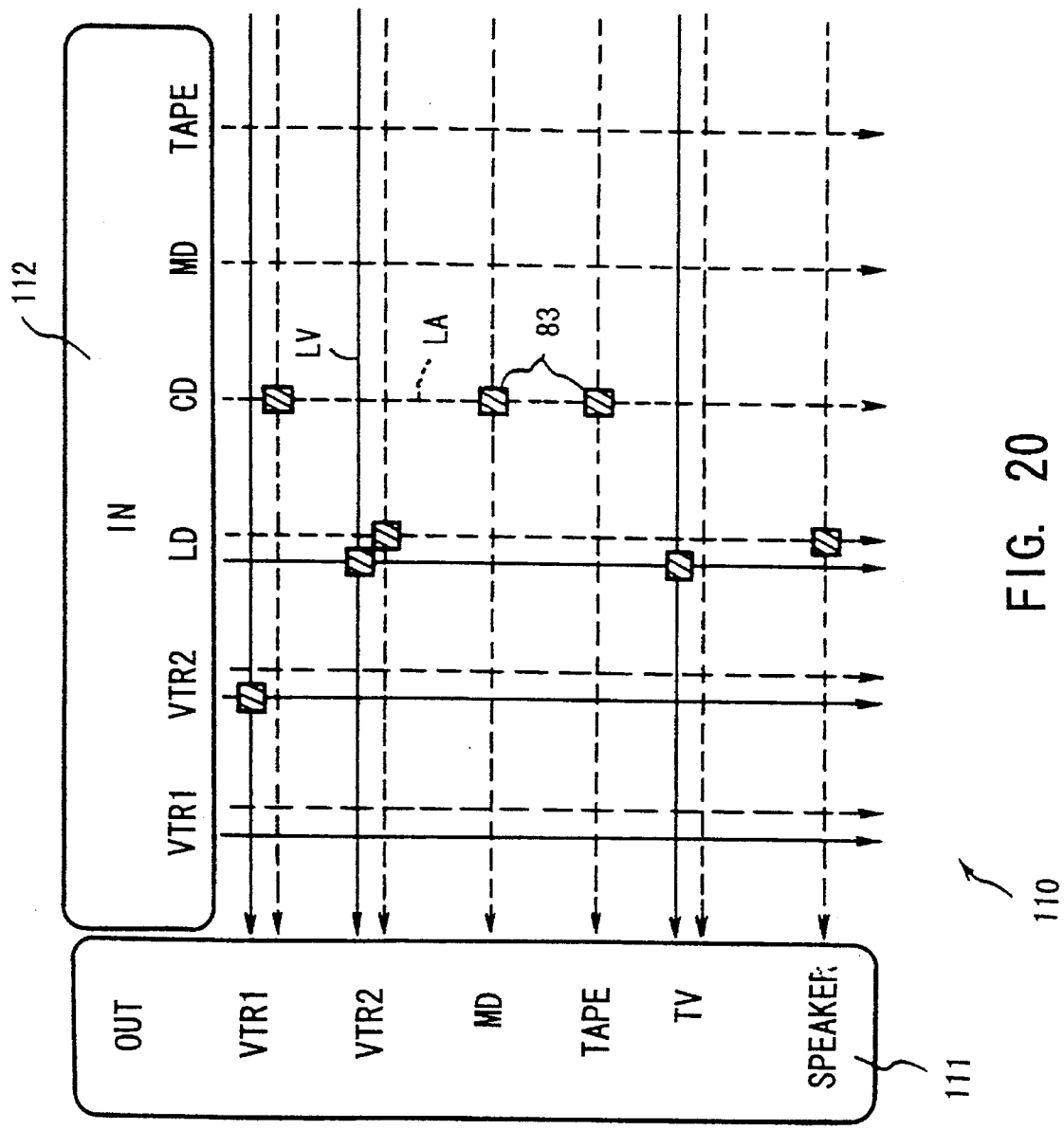
FIG. 20 is a schematic diagram showing a switcher display portion according to another embodiment.

Although the foregoing embodiment is arranged in such a manner that the signal of the cassette auto changer 10 is controlled as the input and output lines of the switcher 20. However, this invention is not only limited to this, but can be preferably applied to a switcher that controls, for example, audio signal line LA and video signal line LV as shown in FIG. 20. In this case, it is necessary to display, on the monitor, a switcher display portion 110 having an input bus character 112 and an output bus character 111 as shown in FIG. 20.

As described above, the cassette auto changer control apparatus of this invention can be obtained following effects.

First, the states of respective component (respective device) of the cassette auto changer visually are displayed on the display screen of the monitor at once, to operate these respective component (respective device) on the display screen. It is realized the cassette auto changer control apparatus in which confirmation of the states of respective component (respective device) of the cassette auto changer and operation can be improved more easily.

Second, the state of the cassette accommodating unit (bin) of the cassette auto changer is visually displayed on the display screen of the monitor, to specify the cassette illustration of the cassette accommodating unit (bin) by a predetermined operating means. It is realized the cassette auto changer control apparatus in which confirmation of the state of the cassette accommodating unit (bin) of the cassette auto changer and conveying specification of the cassette can be improved more easily.

Third, the state of recording and/or reproducing apparatus of the cassette auto changer is visually displayed, to operate of the recording and/or reproducing apparatus on the display screen. It is realized the cassette auto changer control apparatus in which confirmation of the state of the recording and/or reproducing apparatus of the cassette auto changer and operation can be improved more easily.

Fourth, the state of the cassette accommodating unit (bin) of the cassette auto changer and the recording and/or reproducing apparatus are visually displayed on the display screen of the monitor, to designate the sender and receiver in cassette conveying on the display screen of the cassette accommodating unit and the recording and/or reproducing apparatus. It is realized the cassette auto changer control apparatus in which the cassette can be conveyed between thus designated sender and receiver (between the cassette accommodating unit and the recording and/or reproducing apparatus, between the cassette accommodating units (bins), and between the recording and/or reproducing apparatuses).

Further, the changing of the state of the cassette accommodating unit (bin) and the recording and/or reproducing apparatus by movement of the cassette, is displayed sequentially on the illustration of the cassette accommodating unit (bin) and the recording and/or reproducing apparatus. It is realized the cassette auto changer control apparatus in which the conveyance state of the cassette can be easily confirmed.

Fifth, the state of the cassette accommodating unit (bin) of the cassette auto changer and the recording and/or reproducing apparatus are visually displayed on the display screen of the monitor, to designate directly the illustration of a return operation key displayed at a part of the illustration of the recording and/or reproducing apparatus on the monitor. It can be realized the cassette auto changer control apparatus for sending back the cassette loaded into thus designated recording and/or reproducing apparatus to the accommodating position of the cassette accommodating unit (bin).

Further, changing of the state of the cassette accommodating unit (bin) and the recording and/or reproducing apparatus by movement of the cassette are visually and sequentially displayed as the illustration of the cassette accommodating unit (bin) and the recording and/or reproducing apparatus. It can be realized the cassette auto changer control apparatus for confirming the returning state of the cassette.

Sixth, the input line and output line of the switcher and the connection state are visually displayed on the display screen of the monitor, to operate directly the connection switching of the switcher by the display screen illustrated the switcher, in order to switch the switcher and confirm the connection state at once. It is realized that the cassette auto changer control apparatus can be improved its use ability.

Further, because while operating the cassette auto changer, only the monitor line is operated on the display screen of the monitor, it is realized the cassette auto changer control apparatus in which errors, for example, mischange of the motion of the cassette auto changer etc., can be prevented previously.

Furthermore, because the setting is changed corresponding to the switcher configuration of the illustration of the switcher illustrated on the display screen of the monitor- (number of input line and output line), it is realized the cassette auto changer control apparatus in which the switcher illustration illustrated on the display screen of the monitor is corresponding to various configuration of switchers.

While there has been described in connection with the preferred embodiments of the invention, it will be obvious to those skilled in the art that various changes and modifications may be aimed, therefore, to cover in the appended claims all such changes and modifications as fall within the true spirit and scope of the invention.

What is claimed is:

1. An automatic cassette changer, comprising:

a plurality of bins for storing a plurality of cassettes having recording media;

a plurality of reproduction means for reproducing data from said recording media;

an elevator for conveying said cassettes from said plurality of bins to said plurality of reproduction means, from one of said plurality of bins to another, and from one of said reproduction means to another;

display means for displaying a visual illustration of said cassettes in said plurality of bins and said plurality of reproduction means on a same display screen;

selecting means for selecting a source cassette and a destination therefor; and control means for controlling said elevator to move said source cassette to said destination and thereafter changing said visual illustration of said display means to update the locations of said cassettes.

2. An automatic cassette changer according to claim 1, wherein:

said selecting means further selects a desired function of said reproduction means and said display means further displays operation states of said reproduction means.

3. An automatic cassette changer according to claim 1, wherein:

said selecting means includes a cursor displayed on said display screen and a mouse for controlling a movement of said cursor and performing the selection.

4. An automatic cassette changer according to claim 1, further comprising switching means for outputting said data from said reproduction means via a plurality of output lines; and wherein:

said selecting means further selects which of said plurality of said output lines is connected to which of said plurality of reproduction means;

said control means controls said switching means to establish the selected connection; and said display means displays a visual illustration of the selected connections.

5. A method for moving cassettes in an automatic cassette changer, comprising the steps of:

storing a plurality of cassettes having reproducing media in a plurality of bins;

reproducing data from said cassettes in a plurality of reproducing devices;

displaying a visual illustration of said cassettes in said plurality of bins and said reproducing devices on a same display screen;

selecting a source cassette and a destination thereof;

conveying said cassettes from said plurality of bins to said plurality of reproducing devices, from one of said plurality of bins to another and from one of said plurality of reproducing devices to another, in response to the selection of said source cassette and said destination; and updating said display screen with the new locations of said cassettes.

6. A method according to claim 5 wherein said step of selecting further selects a desired function of the reproducing devices and said step of displaying further displays operation states of said reproducing devices.

7. A method according to claim 5, further comprising the step of outputting said data from said plurality of reproducing devices via a plurality of output lines; and wherein said step of selecting further selects which of said plurality of output lines is connected to which of said reproducing devices and said step of displaying further displays a visual illustration of the selected connections.

8. An automatic cassette changer, comprising:

a plurality of bins for storing a plurality of cassettes having recording media;

a plurality of recording means for recording data on said recording media;

an elevator for conveying said cassettes from said plurality of bins to said plurality of recording means, from one of said plurality of bins to another, and from one of said recording means to another;

display means for displaying a visual illustration of said cassettes in said plurality of bins and said plurality of recording means on a same display screen;

selecting means for selecting a source cassette and a destination therefor; and control means for controlling said elevator to move said source cassette to said destination and thereafter changing said visual illustration of said display means to update the locations of said cassettes.

9. An automatic cassette changer according to claim 8, wherein:

said selecting means further selects a desired function of said recording means and said display means further displays operation states of said plurality of recording means.

10. An automatic cassette changer according to claim 8, wherein:

said selecting means includes a cursor displayed on said display screen and a mouse for controlling a movement of said cursor and performing the selection.

11. An automatic cassette changer according to claim 8, further comprising switching means for inputting said data to said recording means from a plurality of input lines; and wherein:

said selecting means further selects which of said plurality of said input lines is connected to which of said plurality of recording means;

said control means controls said switching means to establish the selected connection; and said display means displays a visual illustration of the selected connections.

12. A method for moving cassettes in an automatic cassette changer, comprising the steps of:

storing a plurality of cassettes having recording media in a plurality of bins;

recording data to said cassettes in a plurality of recording devices;

displaying a visual illustration of said cassettes in said plurality of bins and said recording devices on a same display screen;

selecting a source cassette and a destination therefor;

conveying said cassettes from said plurality of bins to said plurality of recording devices, from one of said plurality of bins to another and from one of said plurality of recording devices to another, in response to the selection of said source cassette and said destination; and updating said display screen with the new locations of said cassettes.

13. A method according to claim 12 wherein said step of selecting further selects a desired function of the recording devices and said step of displaying further displays operation states of said recording devices.

14. A method according to claim 12, further comprising the step of inputting said data to said plurality of recording devices from a plurality of input lines; and wherein said step of selecting further selects which of said plurality of input lines is connected to which of said recording devices; and said step of displaying further displays a visual illustration of the selected connections.

* * * * *